US008234637B2

(12) United States Patent
Ghosh-Roy et al.

(10) Patent No.: US 8,234,637 B2
(45) Date of Patent: Jul. 31, 2012

(54) NON-BLOCKING SEMANTICS FOR MODELING SYSTEMS

(75) Inventors: Rajiv Ghosh-Roy, Hudson, MA (US); John Edward Ciolfi, Wellesley, MA (US)

(73) Assignee: The Mathworks, Inc., Natick, MA (US)

( * ) Notice: Subject to any disclaimer, the term of this patent is extended or adjusted under 35 U.S.C. 154(b) by 523 days.

(21) Appl. No.: 12/558,301

(22) Filed: Sep. 11, 2009

(65) Prior Publication Data

US 2011/0067017 A1   Mar. 17, 2011

(51) Int. Cl.
*G06F 9/45* (2006.01)

(52) U.S. Cl. ....................................................... 717/155

(58) Field of Classification Search .................. 717/151, 717/154–156
See application file for complete search history.

(56) References Cited

U.S. PATENT DOCUMENTS

| | | | | |
|---|---|---|---|---|
| 5,155,836 A * | 10/1992 | Jordan et al. | ..................... | 703/23 |
| 5,442,791 A * | 8/1995 | Wrabetz et al. | ............... | 719/330 |
| 7,200,448 B2 * | 4/2007 | Cachat et al. | .................. | 700/18 |
| 2006/0031640 A1 * | 2/2006 | Henry et al. | .................. | 711/126 |

* cited by examiner

*Primary Examiner* — Anna Deng
(74) *Attorney, Agent, or Firm* — Harrity & Harrity, LLP

(57) ABSTRACT

In an implementation, a computing device-implemented method includes identifying a non-blocking block in a graphical block diagram that includes the non-blocking block and other blocks, the other blocks including one or more non-blocking blocks, one or more blocking blocks, or a combination of one or more non-blocking blocks and one or more blocking blocks, determining whether one or more of the other blocks are dependent on an output from the non-blocking block, and partitioning execution of the non-blocking block into two or more execution stages, generating an order of execution of the graphical blocks, the order including a first stage of execution of the two or more execution stages for the non-blocking block, followed by an execution of one or more of the other blocks that have been determined not be dependent on the output from the non-blocking block, followed by a second stage of execution of the two or more execution stages.

43 Claims, 12 Drawing Sheets

NON-BLOCKING SEMANTICS FOR MODELING SYSTEMS

BACKGROUND

Technical computing environments (TCES) may present a user, such as a scientist or an engineer, with an environment that enables efficient analysis and generation of technical applications. In some technical computing environments, for example, the user may perform advanced analysis, visualize data, and develop algorithms. Ideally, the technical computing environment enables a technical researcher or a designer to efficiently and quickly perform tasks, such as research, product development, software and system development, etc.

Existing technical computing environments may be implemented as or executed in conjunction with a graphically-based environment. For example, in one existing graphically-based technical computing environment, models may be built by connecting graphical entities, where each entity may represent an object associated with particular functionality and/or data. A block diagram-based system is an example of a graphically-based technical computing environment.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
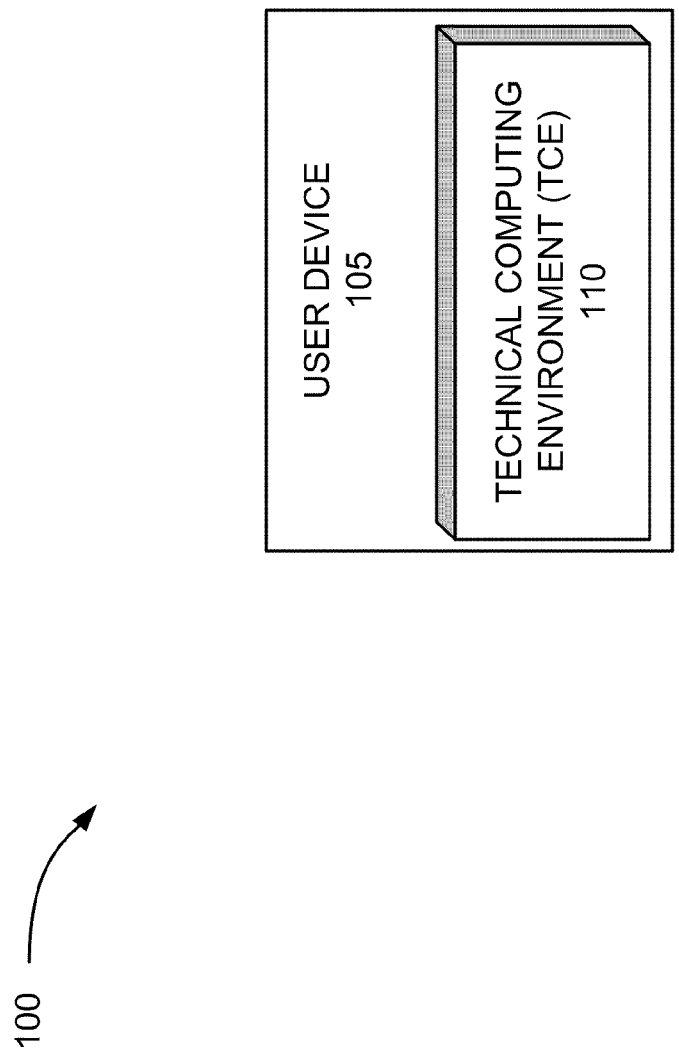
FIG. 1 is a diagram illustrating an exemplary environment associated with the concepts described herein.

The following detailed description refers to the accompanying drawings. The same reference numbers in different drawings may identify the same or similar elements. Also, the following description does not limit the invention.

In a block diagram-based system, a user may interconnect blocks in a graphical user interface (GUI). The block diagram may represent a model of a system, for example, a dynamic system or a signal processing system. In an implementation, a block in the block diagram may be represented by a number of functions specific to each block. Using object oriented terminology, these functions are often referred to as block methods. For example, in time-based diagrams in the Simulink® software application, by The MathWorks, Inc., a block may represent a set of equations (dynamic system) and may be implemented by various methods such as InitializeSizes, Start, Terminate, Outputs, Update, Derivatives, etc. Some of the methods may be used to inform the Simulink® software application (e.g., a block diagram executive) of the parameters necessary to set up the block appropriately. Examples of the parameters involved are the block's sample time, dimensions and data types of the input signals and the output signals, etc. These methods may be called during a model compilation phase, where consistency checks may be done and blocks may be sorted. In a next phase of execution, memory needed for working areas (e.g., signals, internal states, run-time parameters, etc.) may be allocated, and lists of blocks methods to execute may be created. Finally, in a simulation loop phase, the block methods may execute multiple times (typically once per iteration) and the block diagram executive may successively compute the states and the outputs of the system, using information provided by the model. This phase may further be broken up into different methods, such as the outputs method (e.g., calculate the outputs of a block based on the inputs and/or internal state) and/or the update method (e.g., compute a block's internal state). It will be appreciated that this description is not intended to be a comprehensive treatment of the Simulink® software application, and there may be other methods that are involved. Additionally, implementations described herein may be applicable to other block diagram-based systems which may or may not use similar semantics.

Execution of an iteration of a model may include, for example, executing compiled or interpreted code corresponding to each block, according to the semantics of the block diagram system being utilized. In this regard, reference to blocks executing, in this description, should be broadly interpreted to mean an execution of a code (e.g., a block code) according to a specified semantics of the block diagram system. In some block diagram systems, execution of an iteration may include executing one or more methods from each block.

In a block diagram-based system, a block in a block diagram may execute in a blocking fashion. Here, a block diagram executive may instruct a block to begin execution, wait for its execution to complete, and then continue with an execution of another block. The block diagram executive often will process the output of the block, which completed its execution, and use that output as an input for the other block. In most cases, the execution of a block takes place with a full involvement of a processor. For instance, a "Gain" block may multiply its input with a parameter, and may output a resulting product. However, for certain blocks, a significant proportion of the operation of the blocks may be coded to perform without the full involvement of the processor. For example, the block diagram executive may instruct a block representing an analog-to-digital (A/D) converter to retrieve a digital representation of an analog voltage. The A/D converter block may in turn set a register to instruct an A/D converter board to start a conversion. The conversion may take a certain amount of time to complete, during which the processor may be essentially in an idle state. The processor may periodically poll a register on an input/output (I/O) board to confirm an end of the conversion. After the conversion is completed, a digital value may be read. During this time period, the processor may be busy polling the A/D converter block, which is working independently of the processor, and waiting for the conversion to be complete. Accordingly, a progression of the execution of other blocks in the block diagram may be suspended until the A/D converter board has completed its execution. The processor may be used more efficiently by instructing the processor to process other blocks, once the A/D converter block has been used to start the conversion, but before the digital equivalent of the analog voltage is needed.

The term "non-blocking block," as used herein, is intended to be broadly interpreted to include a block that permits an executive to continue with an execution of other blocks without having to wait for completion of execution of the block. For example, a non-blocking block may include, but is not limited to, an input/output (I/O) board (e.g., an analog-to-digital (A/D) converter, a digital-to-analog (D/A) converter, or another type of conversion-based component) or a communication component (e.g., a component that communicates with another component, computer, processor, etc.). The term "model" and "block diagram" may used interchangeably throughout this description. A block diagram may correspond to a representation of a model or a portion thereof.

Certain implementations described herein may include devices, systems, and/or methods that may coordinate an execution of blocks of a model based on whether a block is considered a non-blocking block or a blocking block. As described herein, certain environments for modeling a system may permit a user to create and/or utilize blocks that are non-blocking. Here, a compiler may identify non-blocking blocks from blocking blocks. The compiler may determine blocks that are dependent on an output from non-blocking blocks. The compiler may partition execution stages associated with non-blocking blocks into two or more stages. Additionally, an order of execution for executing blocks, polling directives, etc., may be generated. In an implementation, the order of execution may provide that blocks not dependent on one or more outputs from non-blocking blocks may execute without having to wait for completion of execution of the non-blocking blocks.

The compiler may also consider other criteria with respect to a compiling and/or linking of the model. For example, the compiler may utilize execution time information. Execution time information may include execution times associated with non-blocking blocks and/or blocking blocks. For example, in an implementation, a relative execution time associated with a non-blocking block and/or a blocking block may indicate whether a block executes faster or slower than another block. Additionally, the execution time information may include other types of execution times, such as, for example, an exact execution time, an approximate execution time, or a typical execution time, associated with a non-blocking block and/or a blocking block. Additionally, the compiler may utilize user-specified orders of execution. For example, the user may specify, before compilation, that a particular block is to execute before another block. The compiler may compile, absent prohibitive factors (e.g., dependencies, block configuration, etc.), according to the user's specified order of execution.

The compiler may also generate directives for polling a block to determine whether the block has completed its execution. In an implementation, a time in which polling of a non-blocking block and/or a blocking block occurs may be based on a type of non-blocking block or a type of a blocking block. For example, the type of a block may correspond to a category or genre of the block (e.g., a conversion block, an input/output block, etc.), a function and/or an operation associated with the block, etc. Additionally, or alternatively, the time in which polling of a non-blocking block and/or a blocking block may occur may be based on a completion of execution time value associated with the non-blocking block and/or the blocking block. The completion of execution time value may be based on the execution time information, previously described.

FIG. 1 illustrates an exemplary environment 100 that may be associated with concepts described herein. As illustrated, environment 100 may include a user device 105 that includes a technical computing environment (TCE) 110.

User device 105 may include a computational device. For example, user device 105 may include a server, a workstation, a mainframe, a computer (e.g., a desktop computer, a laptop computer) and/or some other type of computational device.

TCEL 110 may include hardware-based logic and/or a combination of hardware and software-based logic that provides a computing environment. The computing environment may permit a user to perform tasks related to disciplines, such as, but not limited to, mathematics, science, engineering, medicine, business, etc.

TCEL 110 may include a dynamically typed language (e.g., a dynamically typed programming language) that can be used to express problems and/or solutions in mathematical notations familiar to those of skill in the relevant arts. For example, TCEL 110 may use an array as a basic element, where the array may not require dimensioning. In addition, TCEL 110 may perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

TCEL 110 may further provide mathematical functions and/or graphical tools (e.g., for creating plots, surfaces, images, volumetric representations, etc.). In an implementation, TCE 110 may provide these functions and/or tools using toolboxes (e.g., toolboxes for signal processing, image processing, data plotting, parallel processing, etc.). In other implementations, TCE 110 may provide these functions as block sets. In still other implementations, TCE 110 may provide these functions in another way, such as via a library, etc.

TCE 110 may include a user interface for creating, compiling, executing, analyzing, validating, etc., a model of a system. TCE 110 may provide one or more environments for modeling the system. For example, TCE 110 may include a graphical-based environment, a textual-based environment, and/or a hybrid environment (e.g., a combination of graphical and textual environments). TCE 110 may connect, access, and/or interface with other software applications, data, devices, and/or other types of resources during a modeling process. It will be appreciated, however, that concepts described herein are not dependent upon and/or are limited to a particular type of TCE.

TCE 110 may provide for the creation and/or use of non-blocking entities in a model. For purposes of discussion, a non-blocking entity will be referred to as a non-blocking block. TCE 110 may include a compiler that compiles non-blocking blocks and/or an executive that executes non-blocking blocks, as will be described in greater detail below.

Although FIG. 1 illustrates an exemplary environment 100, in other implementations, environment 100 may include additional or different components. TCE 110 may be configured to implement one or more embodiments of the invention.

Exemplary User Device Configuration

Figure 2:
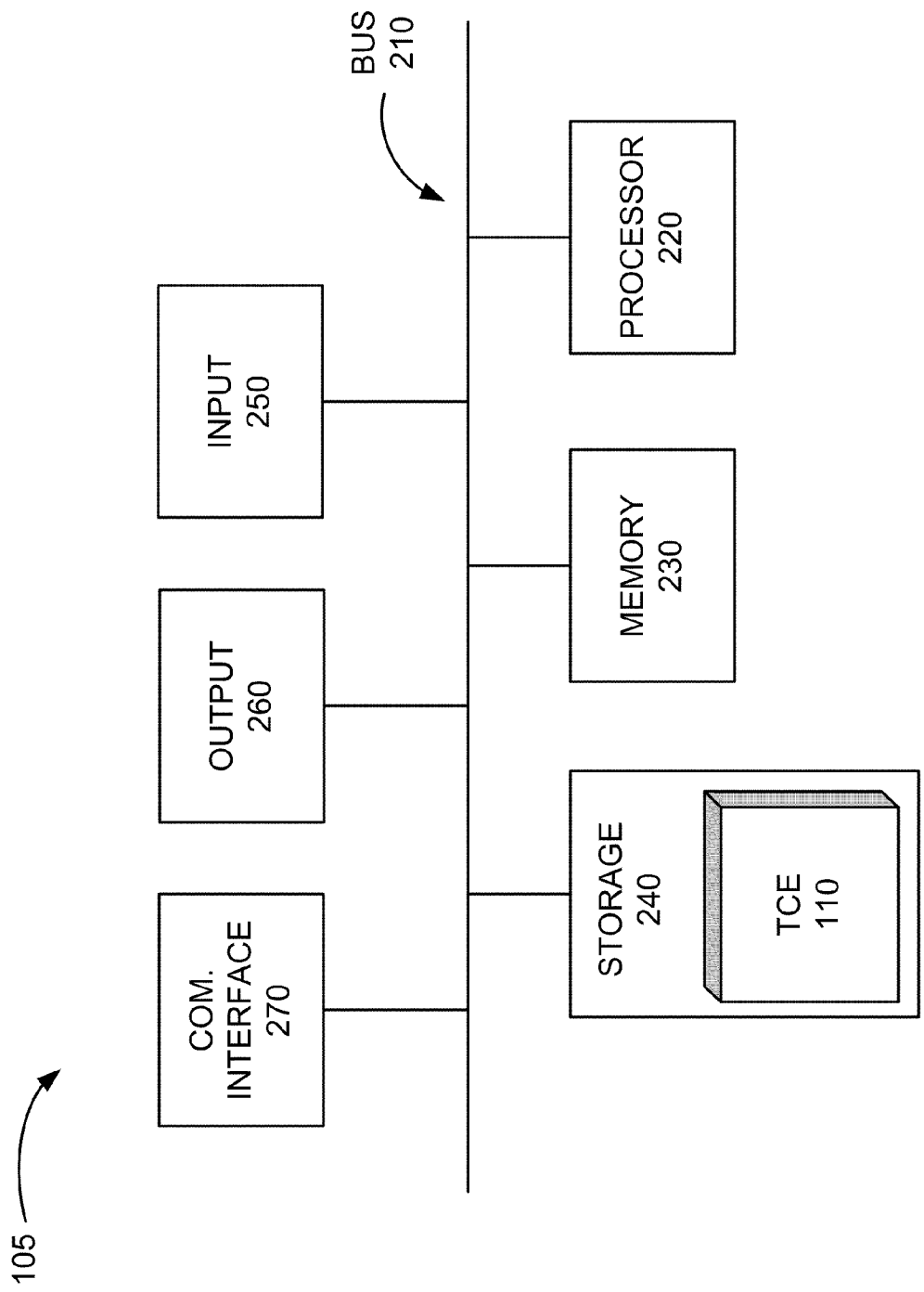
FIG. 2 is a diagram illustrating exemplary components of a user device depicted in FIG. 1.

FIG. 2 is a diagram illustrating exemplary components of user device 105. As illustrated, user device 105 may include, among other things, a bus 210, a processor 220, a memory 230, storage 240, an input 250, an output 260, and/or a communication interface 270.

Bus 210 may permit communication among the other components of user device 105. For example, bus 210 may include a system bus, an address bus, a data bus, and/or a control bus. Bus 210 may also include bus drivers, bus arbiters, bus interfaces, and/or clocks.

Processor 220 may interpret and/or execute instructions. For example, processor 220 may include one or more general-purpose processors, microprocessors, data processors, graphical processing units (GPUs), co-processors, network processors, application specific integrated circuits (ASICs), application specific instruction-set processors (ASIPs), system-on-chip (SOCs), controllers, programmable logic devices (PLDs), chipsets, and/or field programmable gate arrays (FPGAs).

Memory 230 may store data and/or instructions related to the operation and use of user device 105. For example, memory 230 may store data and/or instructions that may be configured to implement one or more implementations of the invention. Memory 230 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 240 may store data and/or software related to the operation and use of user device 105. For example, storage 240 may include a hard disk (e.g., a magnetic disk, an optical disk, a magneto-optic disk, a solid state disk), a compact disc (CD), a digital versatile disc (DVD), a floppy disk, a cartridge, a magnetic tape, and/or another type of computer-readable medium, along with a corresponding drive. The term "computer-readable medium" is intended to be broadly interpreted to include a memory, storage, or the like. The computer-readable medium may be tangible and may be implemented in a single device, in multiple devices, in a centralized manner, or in a distributed manner. The computer-readable medium may correspond to, for example, a physical memory device or a logical memory device that can store executable instructions for performing one or more activities and/or that can store data. A logical memory device may include memory space within a single physical memory device or memory space spread across multiple physical memory devices. The computer-readable medium may store data and/or instructions configured to implement one or more implementations of the invention.

Memory 230 and/or storage 240 may also include a storing device external to and/or removable from user device 105, such as a Universal Serial Bus (USB) memory stick, a hard disk, etc. In an implementation, as illustrated, storage 240 may store TCE 110.

Input 250 may permit the user and/or another device to input information into user device 105. For example, input 250 may include a keyboard, a keypad, a mouse, a display (e.g., a touch screen), a button, a switch, a microphone, voice recognition logic, an input port, and/or some other type of input component. Output 260 may permit user device 105 to output information to the user and/or another device. For example, output 260 may include a display, a speaker, one or more light emitting diodes (LEDs), an output port, and/or some other type of output component.

Communication interface 270 may permit user device 105 to communicate with other devices, networks, and/or systems. Communication interface 270 may include a transceiver-like component. For example, communication interface 270 may include an Ethernet interface, an optical interface, a coaxial interface, a radio interface, and/or some other type of wireless and/or wired interface.

As will be described in detail below, user device 105 may perform certain operations relating to concepts described herein. User device 105 may perform these operations in response to processor 220 executing software instructions contained in a computer-readable medium, such as memory 230 and/or storage 240. The software instructions may be read into memory 230 from another computer-readable medium or from another device via communication interface 270. The software instructions contained in memory 230 and/or storage 240 may cause processor 220 to perform acts that will be described later. Alternatively, hardwired circuitry may be used in place of or in combination with software instructions to implement acts described herein. Thus, implementations described herein are not limited to any specific combination of hardware circuitry and software.

Although, FIG. 2 illustrates exemplary components of user device 105, in other implementations, user device 105 may include fewer, additional, and/or different components, and/or a different arrangement of components than those depicted in FIG. 2 and described. In still other implementations, one or more components of user device 105 may perform one or more other acts described as being performed by one or more other components of user device 105.

Exemplary Technical Computing Environment

Figure 3:
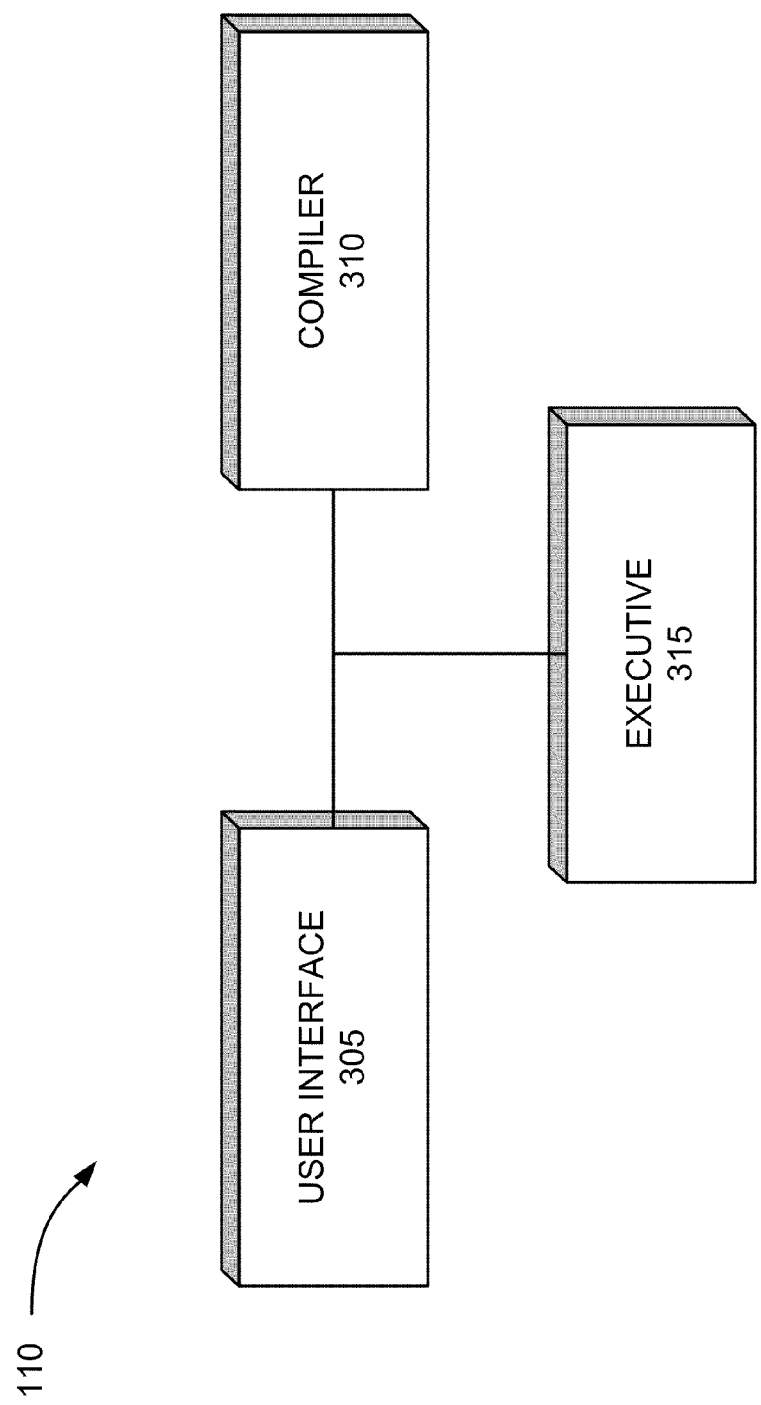
FIG. 3 is a diagram illustrating exemplary components of a technical computing environment.

FIG. 3 is a diagram illustrating exemplary functional components of TCE 110. As illustrated, TCE 110 may include, among other things, a user interface 305, a compiler 310, and an executive 315. The functions described in connection with FIG. 3 may be performed by one or more of the components of user device 105.

User interface 305 may include logic to provide one or more interfaces that aid a user in creating, compiling, executing, and/or analyzing a model of a system. User interface 305 may provide libraries that include predefined entities that may be used to create the model. Additionally, or alternatively, user interface 305 may permit user-defined entities to be created and used when creating the model. For example, user interface 305 may include predefined non-blocking blocks and/or permit user-defined non-blocking blocks to be created and used when creating the model of the system.

Compiler 310 may include logic to provide a transformation of information associated with the model to an alternative form. For example, compiler 310 may be used to convert the model into an internal representation that would allow the block diagram executive to execute the model represented by the block diagram in an interpreted mode (e.g., convert the graphical description embodied by the block diagram into an internal form, allocate data structures for the memory, generate an order of execution, and then execute the pre-written versions of the blocks in the block diagram). Compiler 310 may also convert the model into an internal representation which then allows the generation of code which may then be executed in another executable environment. For example, compiler 310 may generate code (e.g., executable code, target code, intermediate code, etc.) that corresponds to the model. The code may be generated as a textual language (e.g. C/C++) which will then be further compiled and linked into an executable program directly executable by an operating system, including, but not limited to, an operating system on which TCE 110 may be running. For example, compiler 310 and linker may transform the model into generated code in the form of a hardware description language, which can be used to synthesis custom hardware.

Compiler 310 may perform various operations to generate the code. For example, compiler 310 may prepare data structures, evaluate parameters, configure and propagate entity characteristics, determine entity connectivity, determine signal compatibility, etc., associated with the model. Given the expansive nature of existing compilers, it will be appreciated that this description is not intended to be construed as an exhaustive treatment of compilers, code generators, translators, and the like. Compilers may convert or translate a source language to a target language. Thus, for purposes of discussion, compiler 310 will be described as an entity that may convert the model into an executable form, which may be executed. For example, the entity may generate an internal representation of the model for execution in an interpreted mode, and/or the entity may generate textual code for further execution in another environment.

The executable form of the model may include, for example, an executable image, object code, a library, and/or some other form. The executable form of the model may also include code generated in a textual language that is not executable directly by the operating system (e.g., of TCE 110), but runs in another environment (e.g., Java, Perl, MATLAB code, or other interpreted languages). Compiler 310 may permit the user to select a target platform for the generated executable code.

Executive 315 may include logic to execute, run, and/or simulate the executable form of the model and output a result of the executed model.

Although FIG. 3 illustrates a high-level functional diagram of TCE 110, in other implementations, TCE 110 may include fewer, additional and/or different functional components, and/or a different arrangement of functional components than those illustrated in FIG. 3 and described herein.

For example, TCE 110 may import and/or access a stored model that was created in another TCE 110. The imported and/or stored model may then be compiled, executed, etc. For example, the Real-Time Workshop® software application by The MathWorks, Inc. may generate and execute C and C++ code for models created in the Simulink® software application, also by The MathWorks, Inc.

Exemplary Compiler

Figure 4:
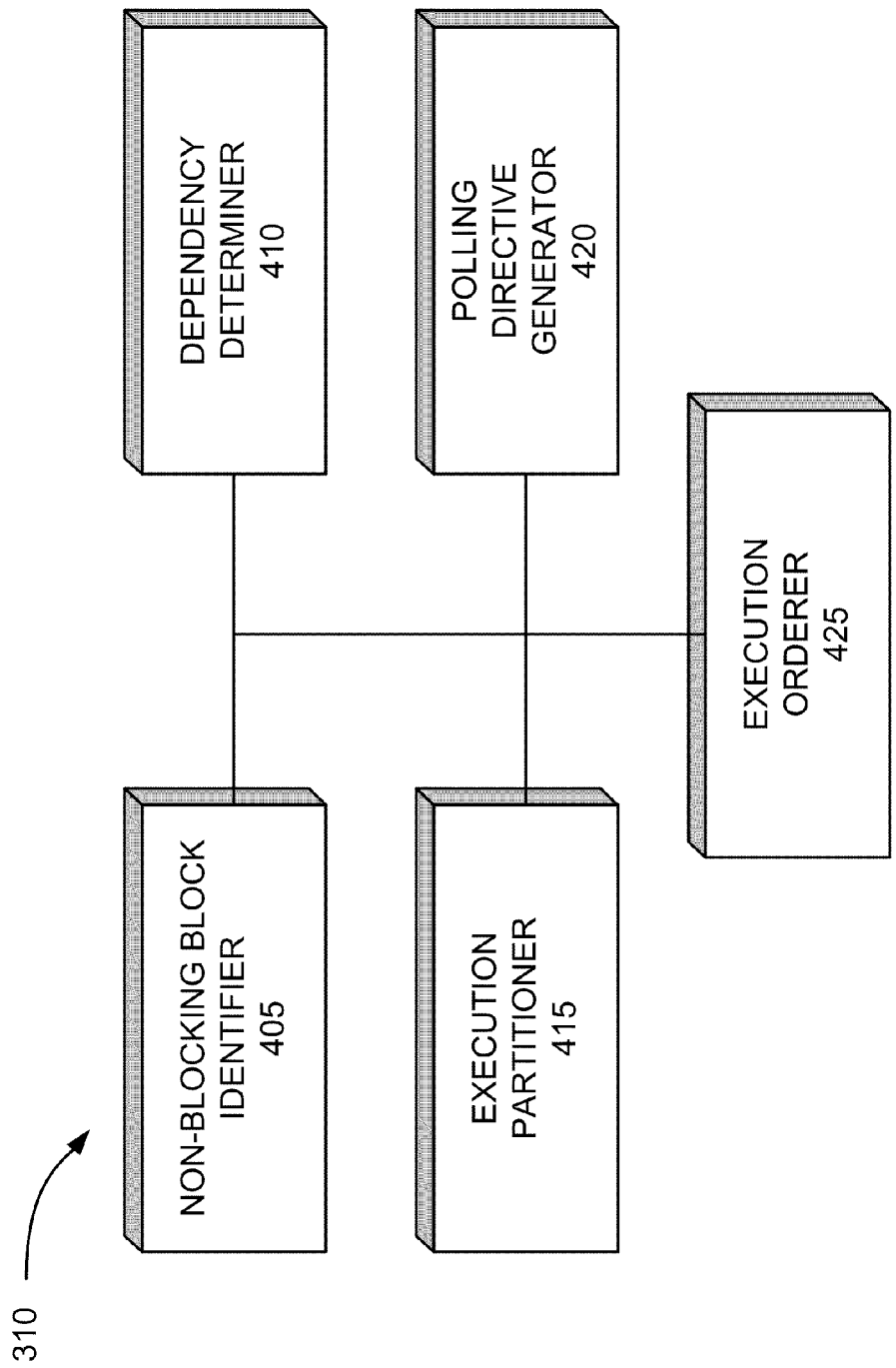
FIG. 4 is a diagram illustrating exemplary functional components of a compiler.

FIG. 4 is a diagram illustrating exemplary functional components of compiler 310. The functions described in connection with FIG. 4 may be performed by one or more of the components of user device 105 as depicted in FIG. 2. As illustrated, compiler 310 may include a non-blocking block identifier 405, a dependency determiner 410, an execution partitioner 415, a polling directive generator 420, and an execution orderer 425. In other implementations, one or more of the functions associated with these functional components may be implemented wholly, or partially, in another component of TCE 110. For example, TCE 110 may include a pre-processing component and/or a post processing component (not illustrated) that performs one or more of the functions associated with these functional components. The pre-processing component and/or the post-processing component may be, for example, a stand-alone component(s), distinct from compiler 310. The pre-processing component and/or the post-processing component may perform one or more of the functions associated with these functional components before and/or after a compiling stage and/or a linking stage. The functions described in connection with FIG. 4 may be performed by one or more components described above in connection with FIG. 2 and/or FIG. 3.

Non-blocking block identifier 405 may identify non-blocking blocks from blocking blocks. Non-blocking block identifier 405 may identify a non-blocking block based on parameters and/or characteristics associated with the non-blocking block. In an implementation, for example, the non-blocking block may have a parameter that indicates its output comprises two or more stages (e.g., an output begin and an output end). This may be in contrast to a blocking block, which may have a parameter that indicates its output comprises a single stage (e.g., output). Additionally, or alternatively, in other implementations, other types of parameters and/or characteristics of the non-blocking block may permit non-blocking block identifier 405 to distinguish the non-blocking block from blocking blocks. The parameters and/or characteristics associated with a non-blocking block may be registered and/or created when the user creates a model utilizing the non-blocking block.

Dependency determiner 410 may determine other blocks that are dependent on identified non-blocking blocks. In an implementation, for example, dependency determiner 410 may determine whether a block's (e.g., a blocking block or a non-blocking block) output depends on an input from an identified non-blocking block. Dependency determiner 410 may determine whether the block's output depends on the input from an identified non-blocking block based on parameters and/or characteristics associated with the block. For example, for a block in which its output depends on its input, dependency determiner 410 may identify whether an identified non-blocking block is connected to the input of the block. Dependency determiner 410 may identify whether the identified non-blocking block is connected to the input of the block based on a configuration and/or one or more settings associated with the block, the identified non-blocking block, and/or a block diagram.

Execution partitioner 415 may partition an execution of identified non-blocking blocks. In an implementation, for example, execution partitioner 415 may partition an execution of an output of an identified non-blocking block into two or more stages. Additionally, or alternatively, execution partitioner 415 may partition an execution of a function and/or an operation associated with the identified non-blocking block into two or more stages.

As previously described, a non-blocking block may permit an executive, such as executive 315, to continue with an execution of other blocks without having to wait for completion of execution of the block. In this way, a waiting period associated with the non-blocking block providing an output and/or a waiting period associated with a function and/or an operation being performed (by the non-blocking block or not) may not impede the execution of other blocks. Thus, this may reduce the overall execution times and provide a more efficient use of available resources. As will be described below, execution of one or more other blocks, which are not dependent on the output and/or completion of execution of the non-blocking block, may be performed.

Polling directive generator 420 may generate directives (e.g., codes, instructions) that initiate a polling to a block (e.g., a non-blocking block or a blocking block).

Execution orderer 425 may provide for the compiling and linking of a block diagram. For example, execution orderer 425 may generate an order of execution for one or more blocks of the block diagram. Execution orderer 425 may also generate an order in which polling directives may be carried out. Execution orderer 425 may determine the order of execution of blocks of the block diagram based on information provided by non-blocking block identifier 405, dependency determiner 410, execution partitioner 415, and/or polling directive generator 420.

Execution orderer 425 may compile, link, and generate the order of execution based on the block diagram. Additionally, execution orderer 425 may compile, link, and/or generate the order of execution (including polling directives) based on additional criteria. For example, in an implementation, a user may specify an order in which one or more blocks are to execute. Execution orderer 425 may generate the order of execution in the order specified by the user provided this specified order does not violate constraints represented within the block diagram (e.g., the configuration of the blocks, dependencies between the blocks, etc.) and/or other prohibitive factors. In an implementation, a heuristic may be used to attempt to honor the user specified order as much as possible, but not fully, if constraints exist. Additionally, or alternatively, the additional criteria may include execution time information associated with non-blocking blocks and/or blocking blocks. In an implementation, the execution time information may correspond to an execution time that is based on a relative speed of execution (e.g., relative execution time), associated with a non-blocking block or a blocking block, in comparison to one or more other non-blocking blocks and/or blocking blocks. For example, it may be known that an execution time of one block is faster or slower relative to another block. Execution orderer 425 may utilize this relative execution time of the blocks when compiling, linking, and/or generating an order of execution (including polling directives) for the blocks.

Additionally, or alternatively, the additional criteria may include other types of execution time information, which may be associated with a non-blocking block or a blocking block. The execution time information may include, for example, an exact value of execution time, an approximate value of execution time, or a typical value of execution time.

The exact value of execution time may correspond to a deterministic execution time value. For example, a precise execution time of a non-blocking block or a blocking block may be known based on a specification associated with the non-blocking block or blocking block (e.g., a specification of an A/D converter). The approximate value of execution time may correspond to an estimated execution time of a non-blocking block or a blocking block. For example, an estimated execution time may be based from a specification associated with the blocking block or non-blocking block. The typical value of execution time may correspond to a heuristic execution time of a non-blocking block or a blocking block. For example, a typical execution time may be based on estimates of typical blocks of similar type (e.g., A/D converters), but not on knowledge of the particular A/D block being used in the model.

The execution time information may be based on a previous execution of the block diagram or a portion thereof. For example, TCE 110 (e.g., executive 315) may collect execution time information and store this information. The execution time information may be accessible to compiler 310. Executive orderer 425 may utilize the execution time information for subsequent compiling and/or linking phases. Additionally, execution time information may be provided and stored by the user.

As previously described, execution orderer 425 may generate an order for polling directives. In an implementation, execution orderer 425 may determine when a poll is to execute in relation to other executions (e.g., of blocks) based on various types of polling information. For example, polling information may include a type of block to be polled. In another example, polling information may indicate whether a non-blocking block is a communication component, an I/O block, etc. Additionally, or alternatively, in other implementations, execution orderer 425 may utilize execution time information associated with a block to be polled.

Exemplary Block Diagrams

Figure 5A:
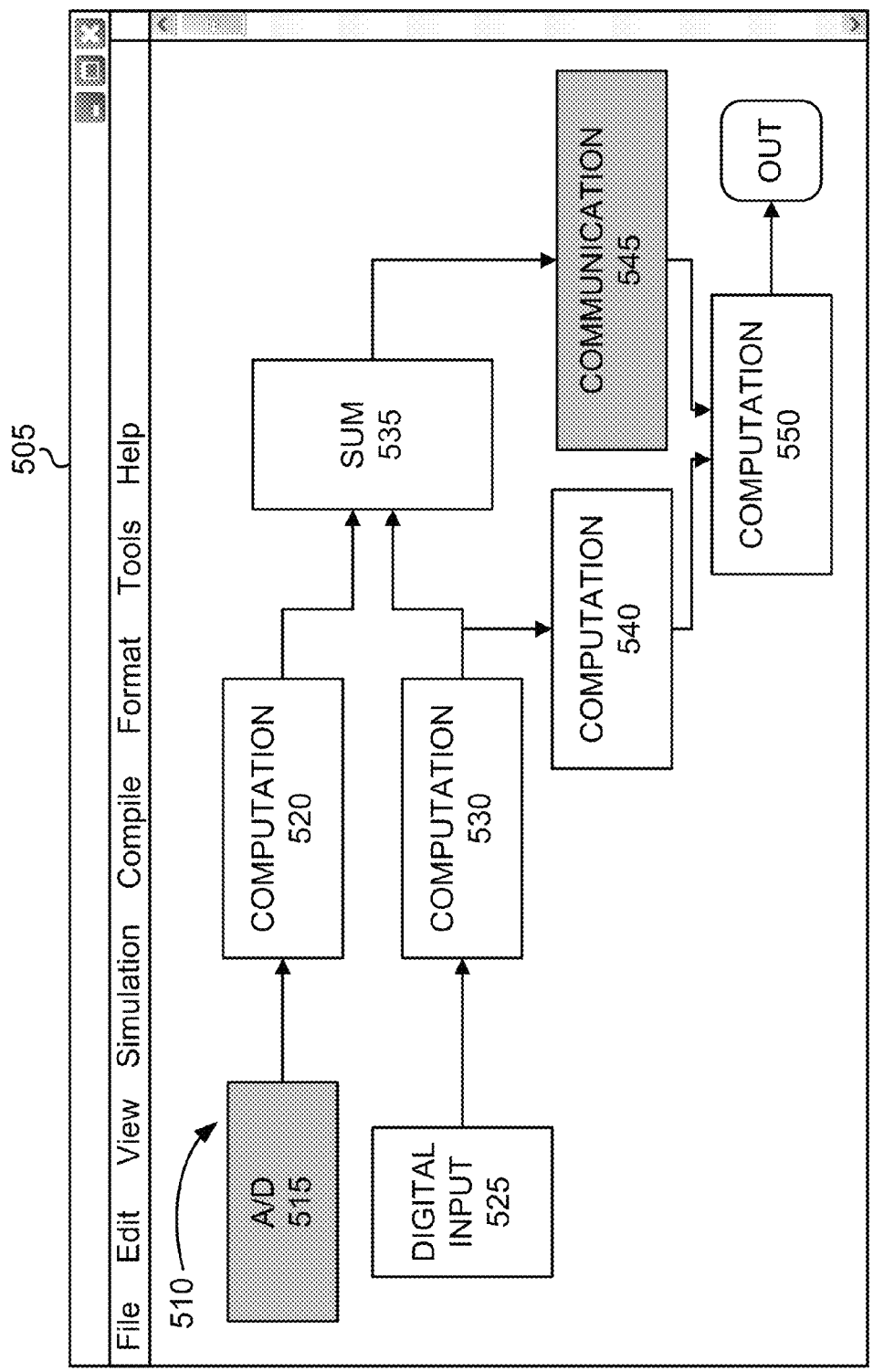
FIGS. 5A and 5B are diagrams illustrating exemplary block diagrams that include a non-blocking block and blocking blocks.
Figure 5B:
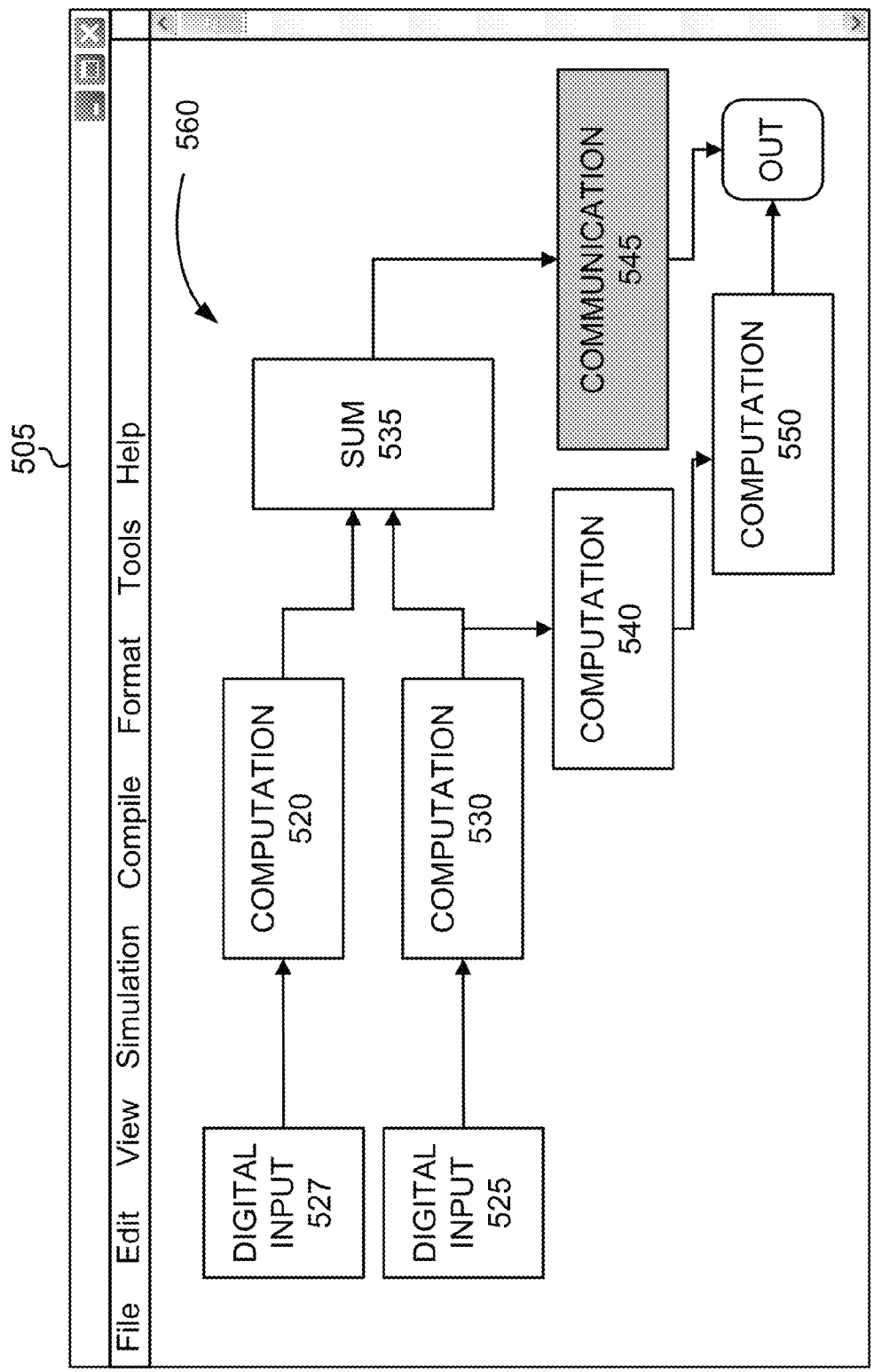

FIGS. 5A and 5B are diagrams illustrating exemplary block diagrams that include a non-blocking block and blocking blocks. FIG. 5A illustrates a block diagram that includes blocks dependent on the non-blocking blocks. FIG. 5B illustrates a block diagram that includes blocks which are not dependent on the non-blocking block.

Referring to FIG. 5A, as illustrated, user interface 305 may provide a GUI 505 in which a user may create an exemplary block diagram 510. Block diagram 510 may include an A/D block 515 (e.g., a non-blocking block), computation blocks 520, 530, 540, and 550 (e.g., blocking blocks), digital input block 525 (e.g., a blocking block), a summation block 535 (e.g., a blocking block), and a communication block 545 (e.g., a non-blocking block). Assume that compiler 310 has compiled block diagram 510 and that executive 315 executes the compiled block diagram 510.

Provided below is a description of an exemplary execution of block diagram 510 based on a compilation of block diagram 510 by compiler 310. For example, executive 315 may instruct A/D block 515 to begin conversion. However, unlike conventional approaches, execution of block diagram 510 is not suspended until A/D block 515 outputs a converted value. Rather, digital input 525 may execute and may drive computation block 530 to execute. Summation block 535 may receive an output from computation block 530. At this stage of execution, summation block 535 may need an output from computation block 520, which in turn depends on an output of A/D block 515, to complete a summation function. In this instance, A/D block 515 may be polled. For example, processor 220 may poll A/D block 515. When A/D block 515 outputs the converted value, summation block 535 may subsequently output a summation to communication block 545. Executive 315 may instruct communication block 545 to output the summation to a slave processor (not illustrated). In an implementation, the slave processor may be associated with a device other than user device 105. In another implementation, the slave processor may correspond to another processor within user device 105 (e.g., as a part of a multi-core or multi-processor environment). Similar to A/D block 515, execution of block diagram 510 is not suspended until communication block 545 receives a value from the slave processor. Rather, executive 315 may instruct computation block 540 to execute and then wait for the value from the slave processor via communication block 545. Communication block 545 may be polled. For example, processor 220 may poll communication block 545. When computation block 550 receives input from computation block 540 and from communication block 545, computation block 550 may execute and output a result, as illustrated. In this way, by executing digital input block 525 and computation block 530 before a completion of execution of A/D block 515, the output may be provided in a shorter time period compared to conventional approaches. Similarly, in this example, by executing computation block 540 before completion of execution by communication block 545, the output may be provided in a shorter time period.

Referring to FIG. 5B, block diagram 560 includes the same blocks as block diagram 510 except A/D block 515 is replaced with digital input block 527. Additionally, communication block 545 is connected in a manner in which other blocks are not dependent on communication block 545.

Provided below is a description of an exemplary execution of block diagram 560 based on a compilation of block diagram 560 by compiler 310. For example, executive 315 may instruct digital input blocks 525 and 527 to execute and drive computation blocks 520 and 530. Computation block 540 may receive an output from computation block 530. In an example case, computation block 540 may begin to execute. In another example case, the execution of computation block 540 may be deferred and instead summation block 535 may execute. For example, summation block 535 may receive outputs from computation blocks 520 and 530 and begin to execute. Communication block 545 may receive an output from summation block 535. Executive 315 may execute a first stage of communication block 545. The output from summation block 535 may be sent to a slave processor (not illustrated). While the slave processor is executing, computation block 540 may execute and computation block 550 may receive an output from computation block 540. Computation block 550 may begin to execute. Communication block 545 may receive an output (e.g., a status (no data)) from the slave processor. Communication block 545 may poll for an existence of a return value from the slave processor by executing a second stage of execution of communication block 545. Communication block 545 may pass the output to the output of block diagram 560. Computation block 550 may output a value to the output of block diagram 560.

As exemplified in this example, among other things, benefits may be gained from the non-blocking nature of a non-blocking block (e.g., communication block 545) even when there is no block dependency on an output of the non-blocking block. For example, in a conventional method, the choice of executing computation block 540 or summation block 535 first may not cause a substantial difference in execution time. However, the non-blocking nature of communication block 545 clearly indicates that executing a stage of communication block 545 prior to the execution of computation block 540 may lead to benefits in shortened execution time.

Although FIGS. 5A and 5B illustrate exemplary block diagrams 510 and 560, in other implementations, the execution of block diagrams 510 and 560 may be different from that described. Additionally, or alternatively, although block diagrams 510 and 560 are represented as a graphical model, depending on the environment (e.g., graphical, textual, hybrid, etc.) a model that includes non-blocking entities may be represented differently from FIGS. 5A and 5B.

Exemplary Acts

Figure 6A:
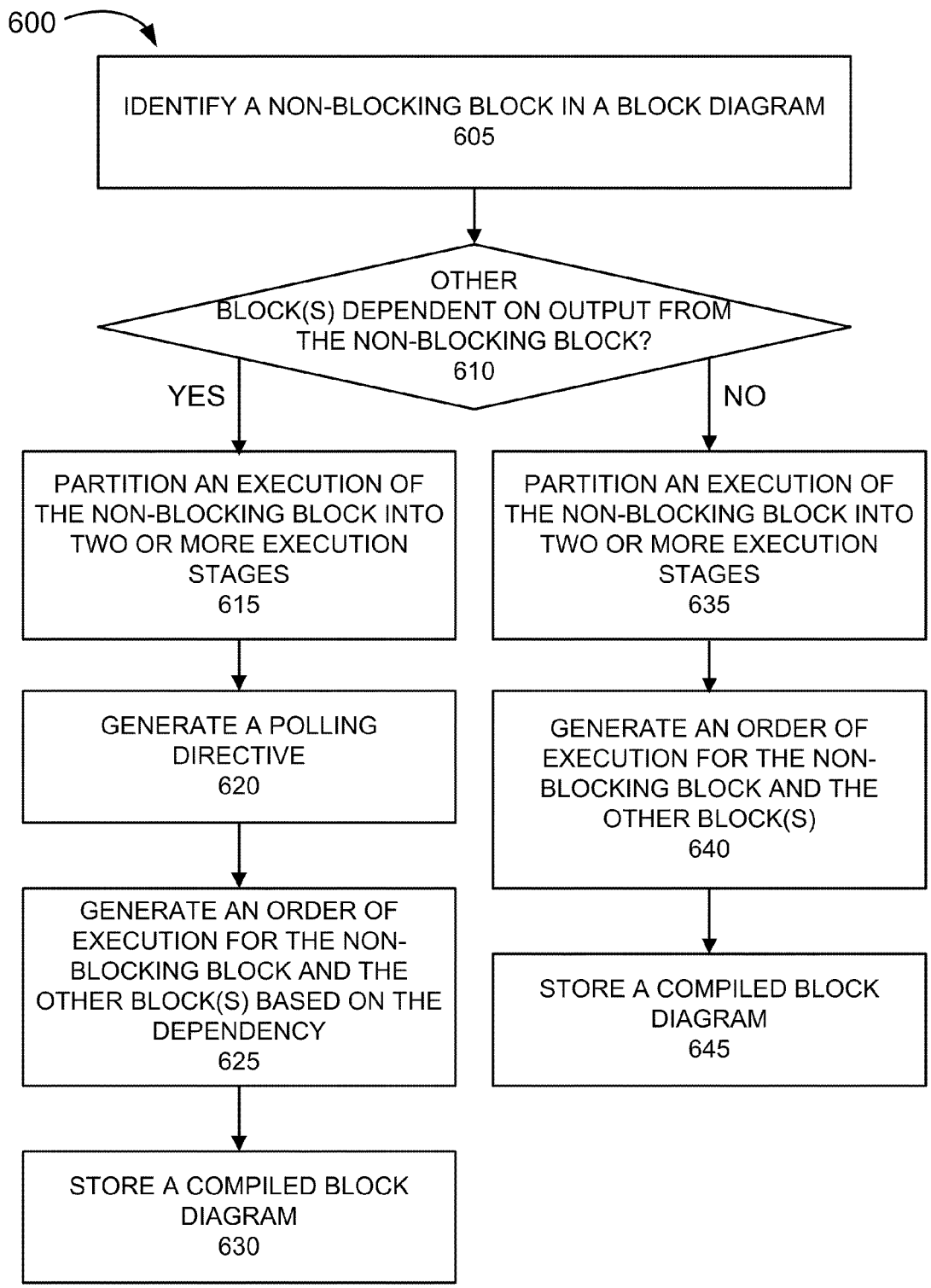
FIG. 6A is a flow diagram illustrating exemplary acts that may be used for compiling a block diagram that includes a non-blocking block.

FIG. 6A is a flow diagram illustrating exemplary acts 600 that may be used for compiling a block diagram and/or creating an executable block diagram. It is assumed that the user has created a block diagram, such as, for example, block diagram 510. The user may initiate a compilation and linking of the block diagram via user interface 305.

As illustrated in FIG. 6A, at block 605 a non-blocking block in a block diagram is identified. For example, as previously described, non-blocking block identifier 405 may identify one or more non-blocking blocks in block diagram 510. Referring to FIG. 5A, non-blocking block identifier 405 may identify A/D block 515 and communication block 545 as non-blocking blocks. Likewise, in block diagram 560 (FIG. 5B), non-blocking block identifier 405 may identify communication block 545 as a non-blocking block.

Non-blocking block identifier 405 may identify a non-blocking block based on parameters and/or characteristics associated with the non-blocking block. In an implementation, for example, the non-blocking block may have a parameter that indicates its output comprises two or more stages (e.g., an output begin and an output end). This may be in contrast to a blocking block, which may have a parameter that indicates its output comprises a single stage (e.g., output). Additionally, or alternatively, in other implementations, other types of parameters and/or characteristics (e.g., functions, operations, etc.) of the non-blocking block may permit non-blocking block identifier 405 to distinguish the non-blocking block from blocking blocks. The parameters and/or characteristics associated with a non-blocking block may be registered and/or created when the user creates the block diagram that includes the non-blocking block.

Referring to FIG. 6A, it may be determined whether other block(s) is/are dependent on an output from the non-blocking block (block 610). For example, as previously described, dependency determiner 410 may determine whether a block's (e.g., a blocking block or a non-blocking block) output depends on the identified non-blocking block. Referring to FIG. 5A, dependency determiner 410 may determine whether an output from computation block 520 and/or summation block 535 depend(s) on an input from A/D block 515. Additionally, dependency determiner 410 may determine whether an output from computation block 550 depends on an input from communication block 545. Referring to FIG. 5B, dependency determiner 410 may determine whether an output from a block in block diagram 560 depends on an input from communication block 545.

Dependency determiner 410 may determine whether a block's output depends on an input from one or more of the identified blocks based on parameters and/or characteristics associated with the block. For example, a block in which the block's output depends on its input, dependency determiner 410 may identify whether an identified non-blocking block is connected to the input of the block. Dependency determiner 410 may identify whether the identified non-blocking block is connected to the input of the block based on a configuration and/or settings associated with the block, the non-blocking block, and/or the block diagram.

Referring to FIG. 5A, dependency determiner 410 may determine that computation block 520 and/or summation block 535 depend(s) on an input from A/D block 515. Additionally, dependency determiner 410 may determine that computation block 550 depends on an input from communication block 545. Referring to FIG. 5B, dependency determiner 410 may determine that there is not a block that depends on an input from communication block 545.

Referring to FIG. 6A, if it is determined that other block(s) is/are dependent on the output from the non-blocking block (block 610—YES), an execution of the non-blocking block may be partitioned into two or more execution stages (block 615). For example, as previously described, execution partitioner 415 may partition an execution of an output of the identified non-blocking block into two or more stages. Additionally, or alternatively, execution partitioner 415 may partition an execution of a function and/or an operation associated with the identified non-blocking block into two or more stages. Referring to FIG. 5A, execution partitioner 415 may partition the execution of A/D block 515 and communication block 545 into two or more stages, respectively.

Referring to FIG. 6A, a polling directive may be generated (block 620). For example, as previously described, polling directive generator 420 may generate a directive that initiates a polling to a block (e.g., the identified non-blocking block and/or other blocks in the block diagram). For example, referring to FIG. 5A, polling directive generator 420 may generate a polling directive for A/D block 515. Polling directive generator 420 may synchronously operate with other components of compiler 310 (e.g., execution orderer 425, etc.) to identify blocks to be polled. Polling directive generator 420 may correspondingly generate a polling directive. It will be appreciated, however, that in other implementations, a polling directive may not be generated. Furthermore, it will be appreciated that in other implementations, a polling directive may be generated even when no block dependencies exist with respect to the non-blocking block.

Referring to FIG. 6A, an order of execution for the non-blocking block and the other block(s) may be generated based on the dependency (block 625). For example, as previously described, execution orderer 425 may provide for a compiling and linking of the block diagram. For example, referring to FIG. 5A, execution orderer 425 may generate an order of execution for the blocks of block diagram 510. However, unlike block 640 (described below), execution orderer 425 is constrained in the order in which the blocks of the block diagram (and polling directives) may execute since other block(s) depend on the output from the identified non-blocking block.

In an implementation, execution orderer 425 may utilize a sorting algorithm to incorporate the non-blocking blocks and their division into two or more stages and generate a sorted list. From the sorted order, execution lists may be created for the block methods. For example, an output block method execution list may be generated by traversing the sorted list identifying blocks with output methods. The resulting execution lists are sometimes referred to as the execution order. To create the sorted list, execution orderer 425 may parse the model into an internal representation and create a directed graph that depicts the dependencies between the various blocks in the model. Execution orderer 425 may perform a topological sort on the directed graph so that an order of execution may be generated that satisfies these dependencies. For example, a conventional depth first search algorithm may be utilized.

It will be appreciated, however, that a depth first search algorithm may produce a topological sort only for an acyclic graph (i.e., a graph which does not have any cycles or circular dependencies). Thus, in the event that the model and correspondingly the graph, has a circular chain of dependencies, a modified depth first search algorithm may be applied. For example, Tarjan's algorithm for strongly connected components may be utilized. In such an algorithm, vertices that form a strongly connected component may be identified and grouped. Additionally, such an algorithm may provide a topological sort for a graph in which the strongly connected components may be considered as a vertex, and the dependencies between the strongly connected components are honored. In other words, the vertex order within a strongly connected component may be indeterminate, but the order of the strongly connected components themselves may form a topological sort.

In one variation of the sort for a block diagram containing non-blocking blocks, a graph may be constructed by first representing blocks as vertices. For example, if block Y depends on block X, this may be represented by an edge from vertex Y to vertex X. It will be appreciated that this may be an opposite order from the block diagram, which may show data dependencies (e.g., an arrow from X to Y). In a correct sort, vertex Y may be placed after its predecessors in the graph (i.e., the vertices from which Y is adjacent). A reverse topological sort may then be performed by performing a depth first search and once all the adjacent vertices of a vertex Y have been visited, Y may be placed on the execution list. In this example, Y depends on X. Since X is adjacent to Y, X will be put on the execution list first.

While the above provides a description in which an order of execution may be generated, it will be appreciated that various sorting algorithms not specifically described may be utilized. In this regard, this description should not be construed as an exhaustive treatment of the expansive nature associated with sorting algorithms.

Figure 6B:
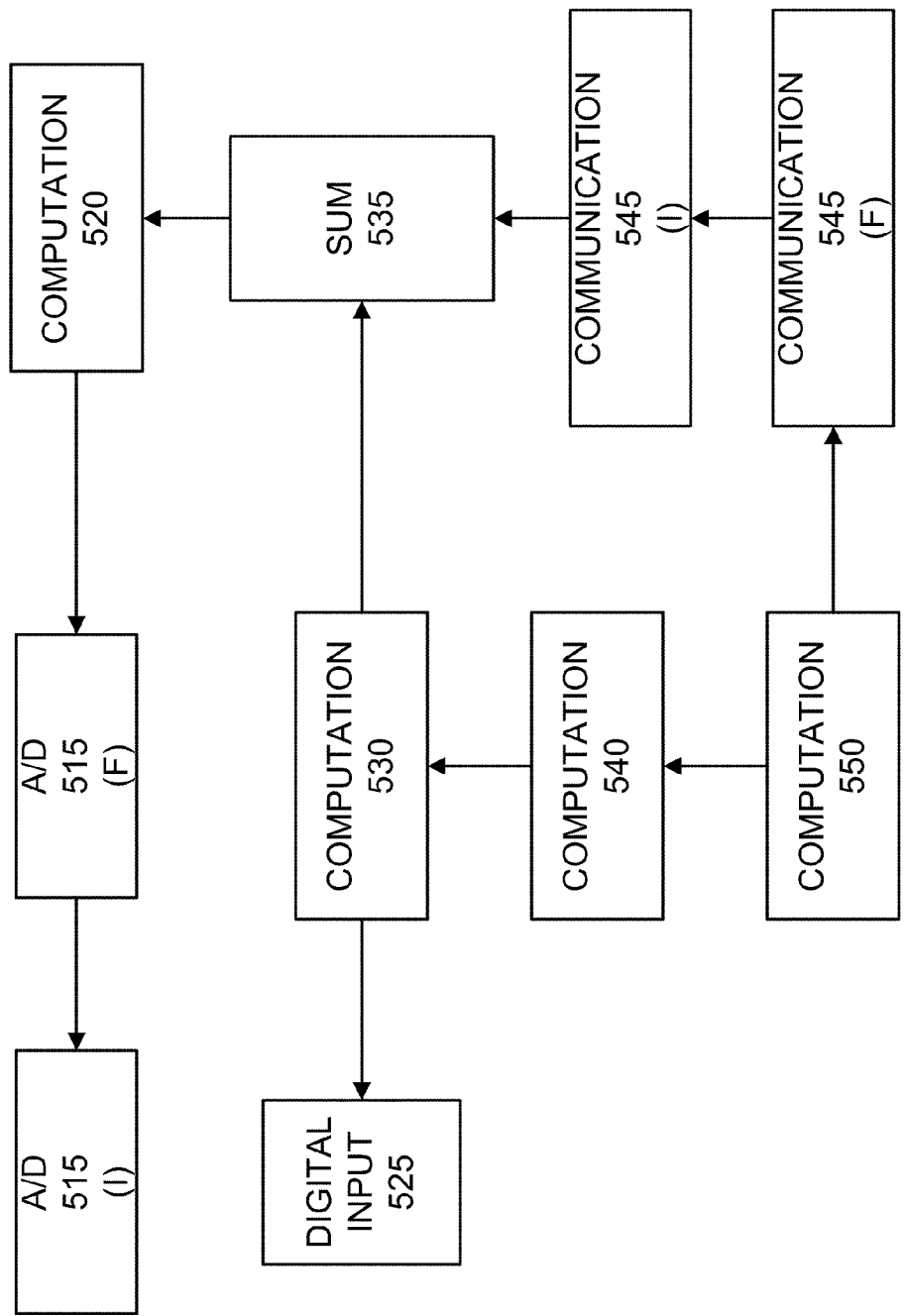
FIG. 6B is a diagram illustrating an exemplary dependency graph that is based on an exemplary block diagram.

For example, computation block 520 is dependent on A/D block 515 and computation block 550 is dependent on communication block 545. FIG. 6B is a diagram illustrating an exemplary dependency graph based on block diagram 505. For example, block diagram 505 may be converted into an equivalent dependency graph, where N may represent a generic non-block block. In this framework, a non-blocking block may be represented as two vertices in the dependency graph, where "I" represents an initial stage, and "F" represents a final stage. That is, a non-blocking block N may be represented by the vertices N(I) and N(F) in the dependency graph. When a non-blocking block depends on an output from another block, an edge may be created from a vertex of the initial stage to a vertex representing the predecessor block. For example, communication block 545 depends on sum block 535. Thus, an edge (illustrated as an arrow in FIG. 6B) may be created from communication block 545(I) to sum block 535. When another block depends on an output of a non-blocking block, an edge may be created from a vertex representing the dependent block to a vertex of the final stage of the non-blocking block. For example, computation block 520 depends on A/D block 515. Thus, an edge may be created from computation block 520 to A/D block 515(F), as illustrated in FIG. 6B. For any non-blocking block N, vertex N(I) should execute before vertex N(F), since vertex N(F) is dependent on vertex N(I), which may be denoted by an edge from N(F) to N(I).

In this example, the dependency graph may list the initial vertices A/D 515(I) and communication 545(I) first, the final vertices A/D(F) and communications 545(F) last, and computation 520 listed just before the final vertices because of computation's 520 adjacency to A/D 515(F). When the depth first search is executed on the dependency graph to obtain the topological sort, the execution order may correspond to A/D 515(I), digital input 515, computation 530, A/D 515(F), computation 520, sum 535, communication 545(I), computation 540, communication 545(F), and computation 550.

While visiting sum 535 during the depth first search, for example, the adjacent vertex computation 520 may be visited first. In the event that the other adjacent vertex computation 520 had been selected, A/D 515(F) would have been sorted to execute just after A/D 515(F). While this may be correct in terms of execution order, it is not the optimal solution. Thus, in an implementation, a backtrack along the vertices may be performed when an N(F) vertex is encountered. Upon finding a parent vertex having multiple adjacencies, the sorting may be guided to ensure that an adjacent node leading the N(F) vertex is sorted last.

A resulting sort of a block diagram having non-blocking blocks may be tailored with certain properties. For example, in an implementation, the resulting sort may have the properties that a non-blocking block N, N(I) may execute early, perhaps as early as possible, while still satisfying dependencies. Correspondingly, N(F) may execute late, perhaps as late as possible.

Under the topological sort described above, the earlier a vertex is visited by the depth first search algorithm (including coalescing strongly connected components into a single equivalent vertex), the earlier the vertex appears in the topological sort. Conversely, the later a vertex is visited during the depth first search algorithm, the later the vertex appears in the topological sort. In this regard, various rules and/or heuristics may be applied to the topological sort, which may yield certain benefits. For example, N(F) should not be reachable from N(I). This is equivalent to the fact that N(I) and N(F) should not be part of the same strongly connected component. If this situation occurs, an error may be generated. Additionally, or alternatively, N(I) should be placed at the top (or proximate to the top) of the vertices lists so that N(I) may be chosen by the depth first search algorithm early and consequently executed early in the execution order. Additionally, or alternatively, N(F) should be placed at the bottom (or proximate to the bottom) of the vertices list and consequently executed late in the execution order. Additionally, or alternatively, vertices adjacent from N(F) should be placed proximate to the bottom of execution list (e.g., before or immediately before vertices representing the final execution stage of the non-blocking blocks). For example, N(F) may be adjacent to another vertex, which may represent a stage of a non-blocking block or a blocking block and may appear fairly early in the execution list. Thus, N(F) may be sorted earlier than is strictly necessary. Additionally, or alternatively, for two non-blocking blocks N and M, if N(I) precedes M(I), N(F) should also precede M(F). In this way, interleaving may be optimized. It will be appreciated that this approach may be applied when there are more than two non-blocking blocks.

It will be appreciated that variations to the ordering between vertices representing non-blocking blocks may be implemented. Since, for example, a depth first search or Tarjan's strongly connected components search may be used to sort, the resulting sort may be influenced by pre-sorting the blocks prior to running the sort. For example, a topological sort may be rerun with a presort where each permutation of vertices N(I) may be placed first in the pre-sorted list and an optimal sort may be selected. This may also be performed with respect to N(F). Additionally, in the case that N(F) is reachable from N(I), the model may still execute by treating N as a blocking block, and executing the stages of execution one after another. Such a situation is called an algebraic loop, and is usually solved by a slow iterative process. In this regard, such an approach may not be applicable to certain applications (e.g., real-time applications). However, the performance of the non-blocking block in such a situation may be no worse than those of the equivalent blocking blocks.

Additionally, as previously described, execution orderer 425 may generate the order of execution (and polling directives) based on a user specified order, relative execution time information, polling information, and/or other criteria.

Referring back to FIG. 6A, the compiled block diagram may be stored (block 630). Compiler 310 may store a compiled block diagram (e.g., block diagram 510) in, for example, storage, such as storage 240. The compiled block diagram may be executable.

If it is determined that other block(s) is/are not dependent on the output from the non-blocking block (block 610—NO) an execution of the non-blocking block may be partitioned into two or more execution stages (block 635). For example, as previously described, execution partitioner 415 may partition an execution of an output of the identified non-blocking block into two or more stages. Additionally, or alternatively, execution partitioner 415 may partition an execution of a function and/or an operation associated with the identified non-blocking block into two or more stages. Referring to FIG. 5B, execution partitioner 415 may partition the execution of communication block 545 into two or more stages.

Referring to FIG. 6A, an order of execution for the non-blocking block and the other block(s) may be generated (block 640). For example, as previously described, execution orderer 425 may provide for the compiling and linking of the block diagram. For example, referring to FIG. 5B, execution orderer 425 may generate an order of execution for the blocks of block diagram 560. However, unlike block 625 (previously described), execution orderer 425 is not constrained in the order in which the blocks of the block diagram (and polling directives) may execute since other block(s) do not depend on the output from the identified non-blocking block (i.e., communication block 545).

Additionally, as previously described, execution orderer 425 may generate the order of execution (and polling directives) based on a user specified order, execution time information, and/or polling information.

Referring to FIG. 6A, the compiled block diagram may be stored (block 645). Compiler 310 may store a compiled block diagram (e.g., block diagram 560) in, for example, storage, such as storage 240. The compiled block diagram may be executable.

Although FIG. 6A illustrates an exemplary sequence of acts, in other implementations, one or more acts associated with the sequence may be performed before and/or after compiling and/or linking, or before the block diagram is in an executable form.

Figure 7A:
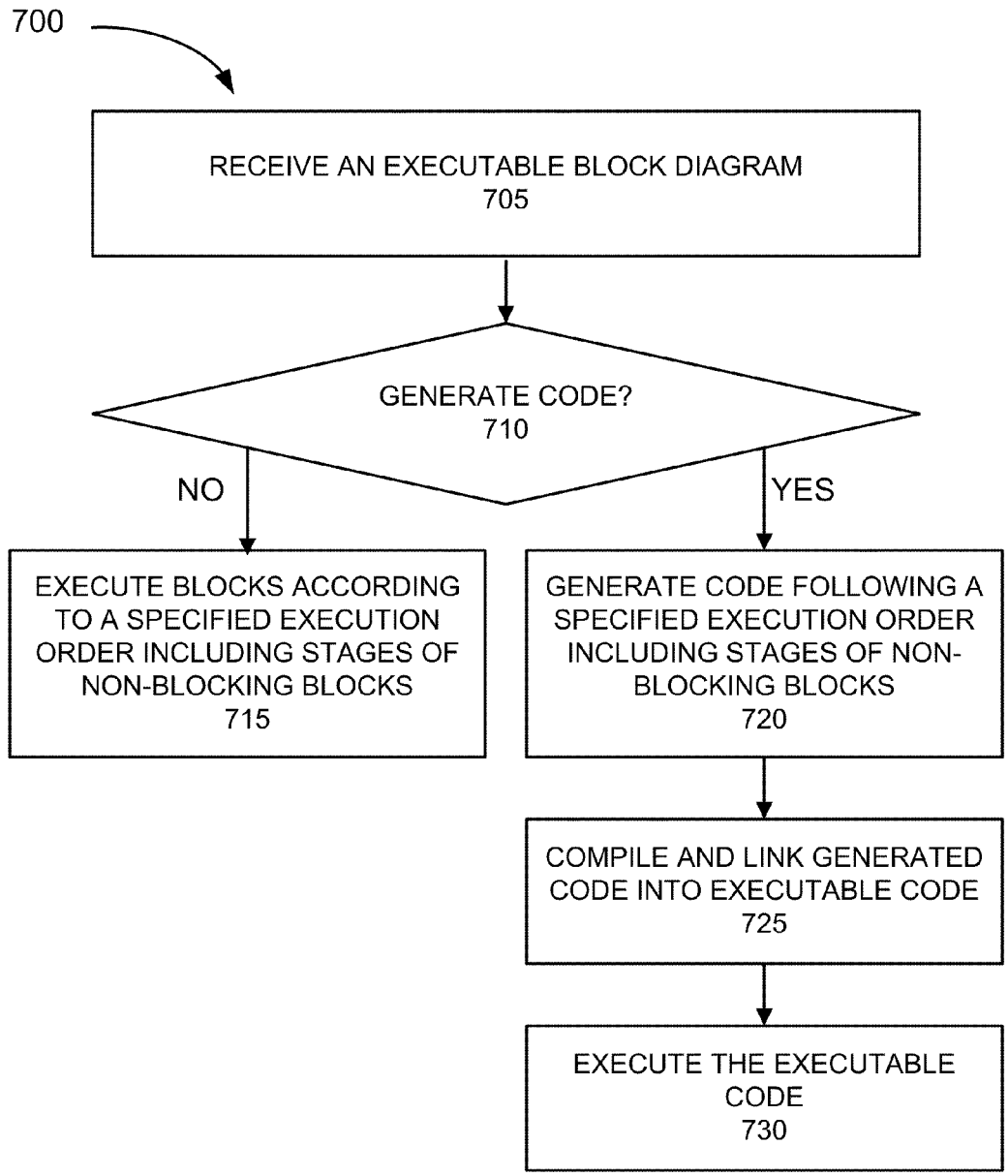
FIGS. 7A and 7B are flow diagrams illustrating exemplary acts that may be used for executing a block diagram that includes a non-blocking block.

As previously described, executive 315 may include logic to execute, run, and/or simulate an executable model (e.g., a block diagram). FIG. 7A is a flow diagram illustrating exemplary acts for executing a block diagram. The acts in FIG. 7A may be performed subsequent to the acts in FIG. 6A.

In an implementation, the compiled block diagram may execute in an interpreted fashion (i.e., under the direct control of the block diagram executive). In such a case, the block diagram executive may call the methods of the various pre-compiled blocks in the execution order as determined by the acts illustrated in FIG. 6A. Alternatively, in another implementation, textual code (e.g. C/C++) may be generated by compiler 310, which may implement the algorithm described in the block diagram via user interface 305. The generated code may implicitly encode the order of execution by means of the order of the generated code, or may include explicit dependency information in a table or other data structure.

As illustrated in FIG. 7A, exemplary acts 700 may include receiving an executable block diagram (block 705). For example, a user may initiate an execution of an executable form of block diagram 510 (as illustrated in FIG. 5A) via user interface 305. Executive 315 may receive executable block diagram 510. For simplicity, a portion of the execution of block diagram 510 is described below.

It may be determined whether code is generated (block 710). For example, as previously described, the block diagram may be executed in an interpreted fashion or not. If it is determined that code does not need to be generated (block 710—NO), the block diagram executive may execute the blocks or stages of the blocks according to the execution order specified in block 630. If it is determined that code does need to be generated (block 710—YES), code may be generated that follows an order of execution of the blocks or stages of the blocks specified in block 630.

The generated code may be compiled and linked into executable code (block 725) and the executable code may be executed (block 730). For example, the executable code may be in a format so as to be executable on the same hardware (e.g., user device 105), or may be in a format so as to be executable on a different hardware and/or operating system. For example, if user device 105 corresponds to a computer operating with a first operating system (e.g., Microsoft Windows), the code generated in block 720 may be compiled and linked for the first operating system, for a second operating system (e.g., Linux) (i.e., same hardware but different operating system), or for a digital signal processor (DSP) (i.e., a different hardware and a different operating system). The executable code may then be executed on the appropriate platform.

Figure 7B:
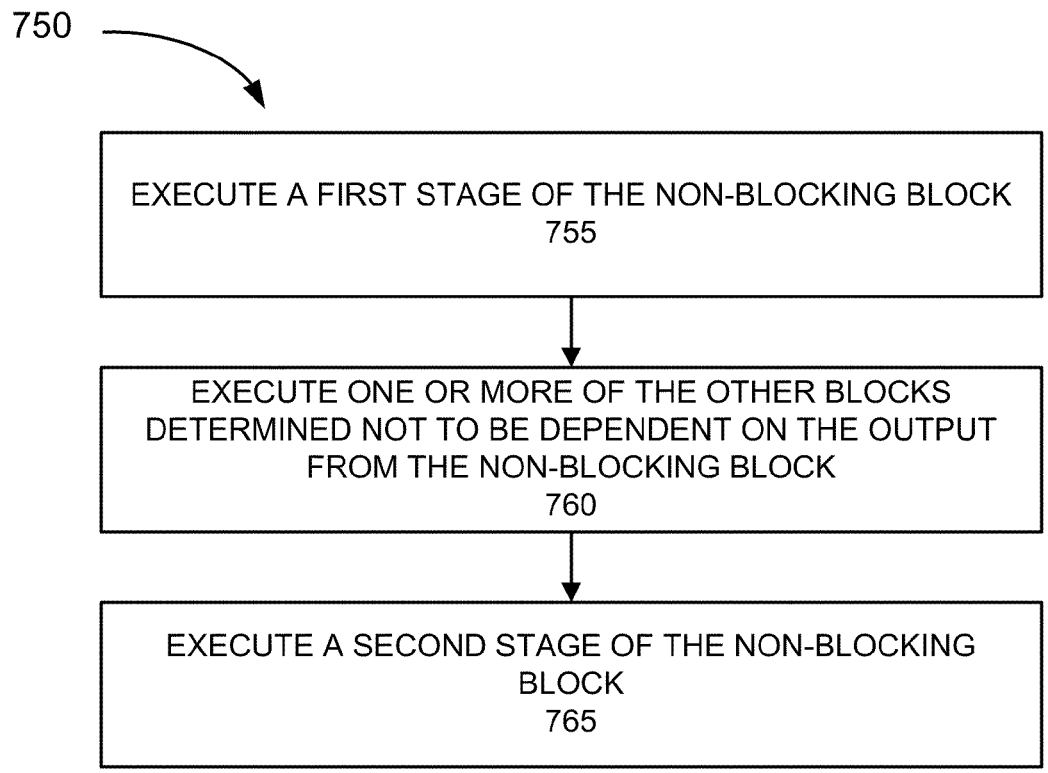

FIG. 7B is a flow diagram illustrating exemplary acts 750 that may be performed during execution of a model.

A first stage of the non-blocking block may be executed (block 755). For example, executive 315 may instruct A/D block 510 to begin a conversion.

One or more of the other blocks determined not to be dependent on the output from the non-blocking block may be executed (block 760). For example, executive 315 may instruct other blocks determined not to be dependent on the output from A/D block 510 to execute. Here, as previously described, executive 315 may instruct digital input 525 to execute, which may drive computation block 530 to execute. Summation block 535 may receive an output from computation block 530.

A second stage of the non-blocking block may be executed (block 765). For example, A/D block 510 may complete the conversion and output the conversion to computation block 520.

Although FIGS. 7A and 7B illustrate an exemplary sequence of acts, in other implementations, one or more acts associated with the sequence may be performed before and/or after compiling and/or linking, or before the block diagram is in an executable form.

If the block diagram system specifies that multiple methods be used to implement run time behavior for an iteration, the non-blocking behavior may apply to any of the methods that may be executed during a run time iteration. For example, the Simulink® software, by The MathWorks Inc., specifies that blocks have an Outputs method, an Update method, and/or a Derivatives method. In such a block diagram system, a typical use case may be for non-blocking behavior to be implemented in the Outputs method. However, non-blocking behavior may also be used for the Update method. For example, the Update method may be used to update an internal state of a block with a value from a non-blocking block (e.g., an A/D converter block), and output of the block may utilize this internal state to compute again, for example, a moving average of values received thus far. In such a case, making the Update method for this block as non-blocking may allow the Update method for the model (i.e., the sum of all of the Update methods for different blocks) to complete in a shorter time.

Figure 6C:
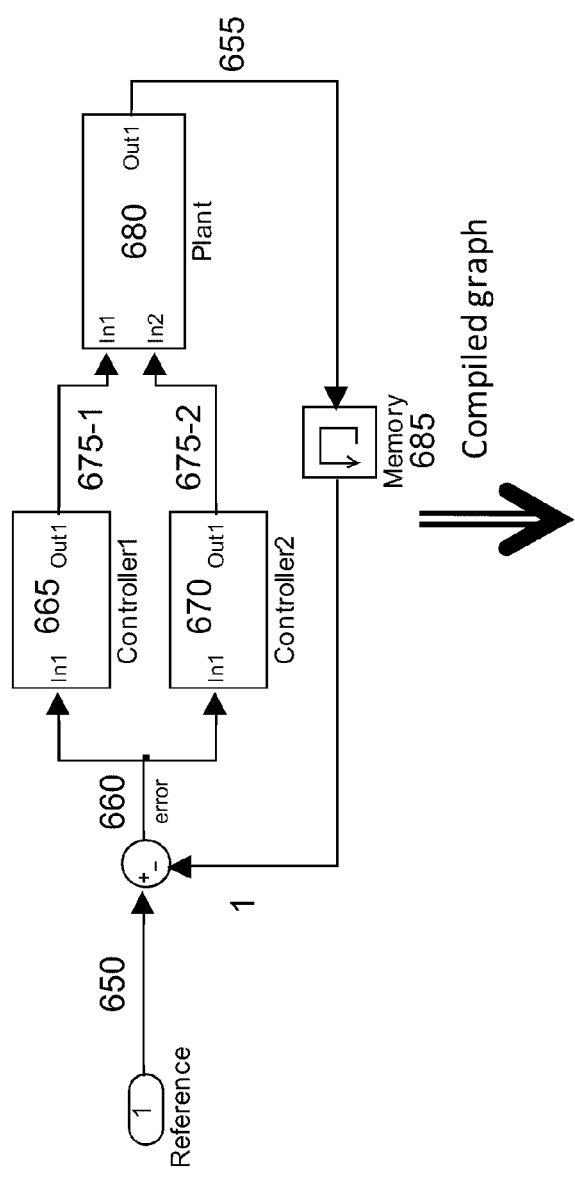
FIG. 6C is a diagram illustrating an exemplary model.

The use of non-blocking blocks can be leveraged to speed up execution even in the absence of I/O blocks. FIG. 6C is a diagram illustrating this concept. For example, FIG. 6C illustrates a model that includes a set of reference signals 650 which are subtracted from a Plant output 655 and a set of error signals 660 is provided to two different controllers, a Controller1 block 665 and a Controller2 block 670. Controller1 block 665 and Controller2 block 670 may perform specific transformations on error signals 660 and produce actuating signals 675-1 and 675-2, respectively, for a Plant block 680. To speed up execution, Controller1 block 665 and Controller2 block 670 may, for example, work in parallel in separate threads or processes in a multi-tasking or multi-processor environment.

Figure 6D:
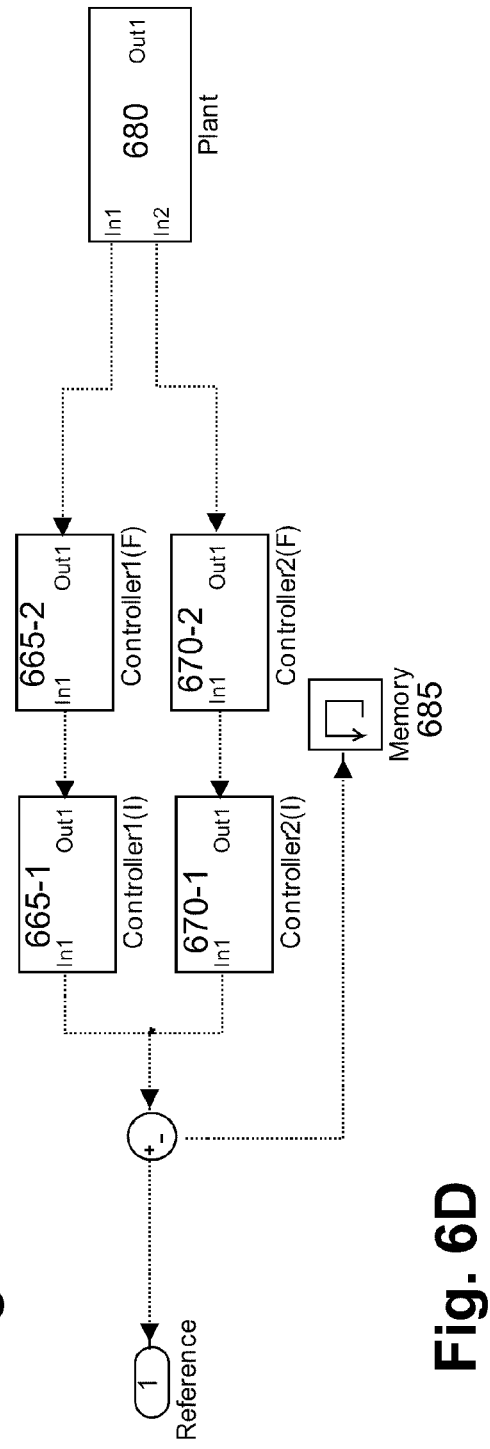
FIG. 6D is a diagram illustrating an exemplary graph that is based on the exemplary model.

To achieve a parallelism, in an implementation, a compilation process may transform the model into a directed graph. As illustrated in FIG. 6D, the arrows have been reversed and a memory block 685 is no longer connected because memory block 685 may include two run-time methods (e.g., Outputs and Update), where the Outputs method may output an internal state of memory block 680, and the Update method may assign an input of memory block 680 to the internal state. In this way, the loop may be broken and an acyclic graph may be produced. In another implementation, where the loop may not be broken, this loop may be solved by an algebraic loop solver (e.g., a set of algebraic equations).

After creating the directed graph, the model compiler (e.g., compiler 310) may generate a sorted list based on a graph sort algorithm previously described. The sorted list may have Controller1(I) 665-1 followed by Controller2(I) 670-1 representing the initial stages of the blocks, which are in turn followed by Controller1(F) 665-2 and Controller2(F) 670-2 representing the final stages of the blocks. During model linking, the sorted list may be used to create the block method executions. Assuming Controller1 block 665 and Controller2 block 670 represent dynamic systems, these block may have both Outputs and Update block methods. Thus, the output block method execution list may include, for example, Controller1(I).Output followed by Controller2(I).Output, which in turn may be followed by Controller1(F).Output followed by Controller2(F).Output. The update block method execution list may include, for example, Controller1(I).Update followed by Controller2(I).Update, which in turn may be followed by Controller1 (F).Update followed by Controller2(F).Update.

A simulation engine or generated code may execute these block method lists. The Controller1(I).Output may initiate computation in a separate thread or process. The Controller2 (I).Output may initiate computation in a separate thread or process. When Controller1(F).Output runs, it may wait for computation of the separate thread to complete. When Controller2(F).Output runs, it may wait for computation of the separate thread to complete. Thus, two initiations of work may be started at the same time, thereby speeding up execution. The same process may be followed for the update block method execution lists.

The division of methods into one or more stages, and sorting data according to data dependency may apply to any block diagram-based system where the blocks execute in sequence, including the case where the blocks (e.g., block methods) execute in sequence several times during an iteration, as previously described (e.g., each block's Outputs method is called, followed by each block's Update method). In particular, these principles may apply to, for example, time-based block diagram systems, such as those found within the Simulink® software application, by The MathWorks, Inc., as well as block diagram systems based on data flow programming. For example, block execution in data flow diagrams tend to be defined by a single block method, often referred to as a fire method. In an implementation, to process a non-blocking block in a data flow diagram, the fire method may be split into two stages (e.g., initial and final) and an internal directed graph containing the blocking block plus the initial and final stages of the blocking blocks may be created. A sorted order may then be generated using a topological sort and from the sorted list the data flow model may be executed.

Conclusion

One or more implementations of the invention may include devices, systems, and/or methods for compiling and/or executing models. Typically, in existing TCEs, entities, such as blocks, in a model may execute in a blocking fashion. That is, the model may be compiled into an executable model, such that, an executive may instruct an entity to execute, wait for the entity's execution to complete, and then begin execution of another entity. However, based on the concepts described herein, these hindrances may be avoided, which may improve the process of developing models of systems. For example, entities of a model may be identified as non-blocking. Execution times of the model may be reduced since waiting periods associated with an execution of a non-blocking entity (e.g., a non-blocking block) may not impede the progress of execution of the model. Additionally, as previously described, user specified orders, execution time information (e.g., exact, approximate, typical), and/or polling information, associated with entities (e.g., blocking blocks and non-blocking blocks) of the model, may be utilized during the compiling, linking, and/or execution phases of the model, which may improve the process of developing models of systems The foregoing description of implementations provides illustration, but is not intended to be exhaustive or to limit the implementations to the precise form disclosed. Modifications and variations are possible in light of the above teachings or may be acquired from practice of the teachings.

Application of the concepts described herein may be employed in various TCEs. As previously mentioned, TCE 110 may represent a model in various forms (e.g., graphical, textual, hybrid, etc.). Examples of a TCE that provides a graphical-based environment include, among others, Simulink® and/or Stateflow® by The MathWorks Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager by PPT Vision; Khoros by Khoral Research; Gedae by Gedae, Inc.; Scicos by the French National Institute for Research in Computer Science and Control (INRIA); Virtuoso by Cadence; Rational Rose by IBM; Rhapsody or Tau by Telelogic; Ptolemy by the University of California at Berkeley, etc. Examples of a TCE that provides a textual-based environment include, among others, MATLAB® by The Mathworks, Inc.; Octave by John Eaton et al. of GNU; Python by the Python Software Foundation (PSF); COMSOL Script by COMSOL AB; MATRIXx by National Instruments; Mathematica by Wolfram Research, Inc.; Mathcad by Mathsoft Engineering & Education Inc.; Maple by Maplesoft; Extend by Imagine That Inc.; Scilab by INRIA and the National School of Bridges and Roads (ENPC); Virtuoso by Cadence; Modelica or Dymola by Dynasim; etc. The TCE may provide a hybrid environment that includes a combination of one or more graphical-based and one or more textual-based environments mentioned above.

In addition, while various acts have been described with regard to FIGS. 6 and 7, the order of the acts may be modified in other implementations. Further, non-dependent acts may be performed in parallel and/or one or more acts may be omitted. Thus, FIGS. 6 and 7 illustrate exemplary acts, and in other implementations, fewer, additional, and/or different acts may be performed. For example, a polling directive may be generated when other block(s) are not dependent on an output from a non-blocking block.

It will also be appreciated that one or more of these acts may be performed on one or more devices and/or may involve one or more TCEs 110. In this regard, the acts described in FIGS. 6, 7A, and 7B should not be construed as limited to a single user device 105 and/or a single TCE 110. For example, one or more embodiments may be implemented in a distributed environment.

Figure 8:
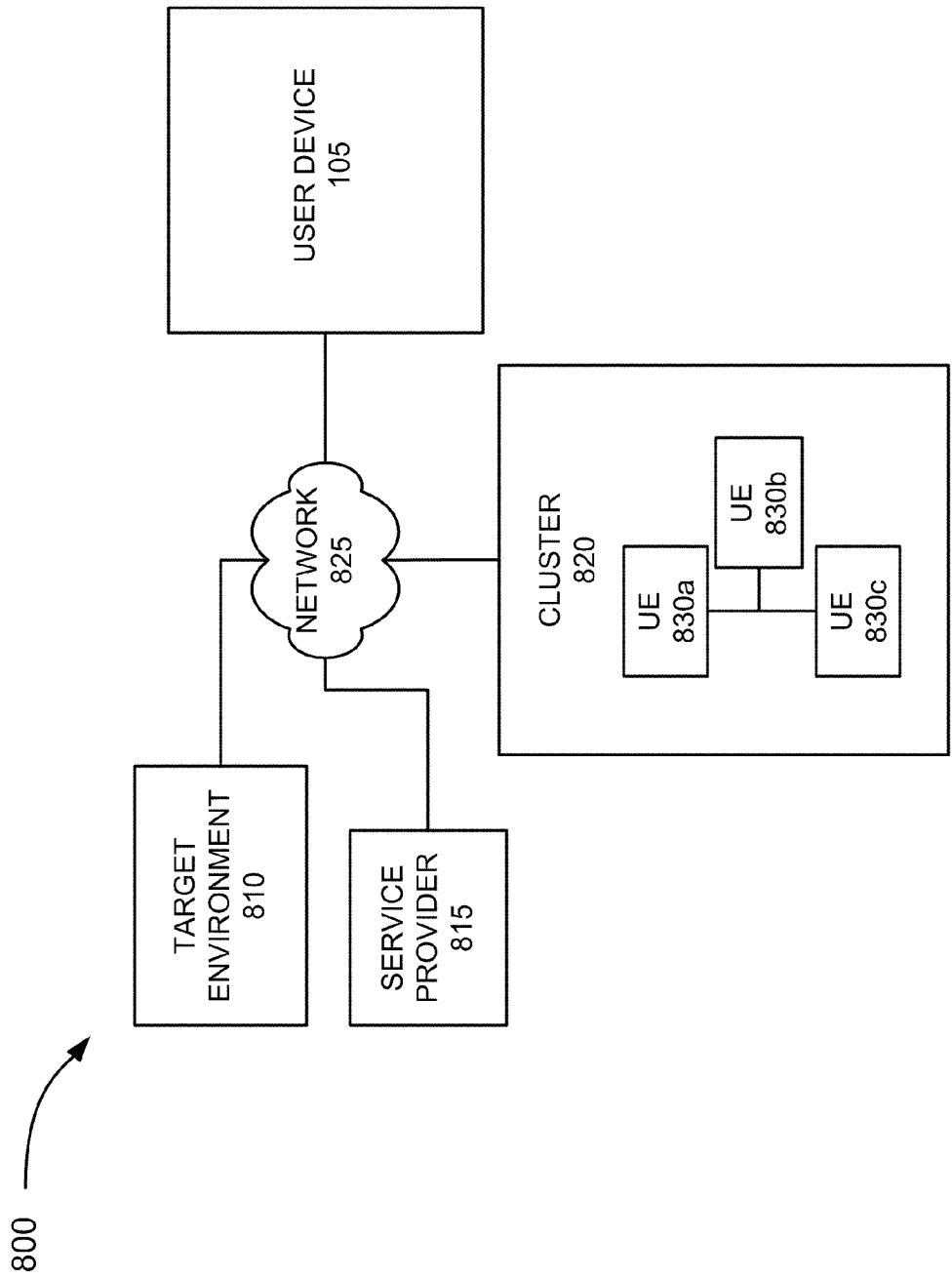
FIG. 8 is a diagram illustrating an exemplary distributed environment that may be configured to implement one or more embodiments described herein.

FIG. 8 illustrates an example of a distributed environment 800 that may be configured to implement one or more embodiments. Referring to FIG. 8, environment 800 may include various entities including user device 105, a target environment 810, a service provider 815, a cluster 820, and a network 825. Note that distributed environment 800 is just one example of a distributed environment that may be used with one or more embodiments. Other distributed environments that may be used with one or more embodiments may include more entities, fewer entities, entities in arrangements that differ from the arrangement illustrated in FIG. 8, and so on. Moreover, distributed environment 800 may be configured to implement various "cloud computing" frameworks.

In distributed environment 800, user device 105 may be configured to, among other things, exchange information (e.g., data) with other entities of distributed environment 800 (e.g., target environment 810, service provider 815, and cluster 820). User device 105 may interface with the network 825 via communication interface 270.

Target environment 810 may be configured to execute and/or interpret a compiled version of a model, which may be generated in or otherwise available to distributed environment 800. Network 825 may include a communication network capable of exchanging information between the entities in network 825. Network 825 may include digital and/or analog aspects. The information may include machine-readable information having a format that may be adapted for use, for example, in network 825 and/or with one or more entities in network 825. For example, the information may be encapsulated in one or more packets that may be used to transfer the information through network 825.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802. 11, etc.

Network 825 may comprise various network devices, such as gateways, routers, switches, firewalls, servers, repeaters, address translators, etc. Portions of network 825 may be wired (e.g., using wired conductors, optical fibers, etc.) and/or wireless (e.g., using free-space optical (FSO), radio frequency (RF), acoustic transmission paths, etc.). Portions of network 825 may include a substantially open public network, such as the Internet. Portions of network 825 may include a more restricted network, such as a private corporate network or virtual private network (VPN). It should be noted that implementations of networks and/or devices operating on networks described herein are not limited with regards to, for example, information carried by the networks, protocols used in the networks, and/or the architecture/configuration of the networks.

Service provider 815 may include logic that makes a service available to another entity in distributed environment 800. Service provider 815 may also include a server operated by, for example, an individual, a corporation, an educational institution, a government agency, and so on, that provides one or more services to a destination, such as user device 105. The services may include software containing computer-executable instructions that implement one or more embodiments of the invention or portions thereof, and may be executed, in whole or in part, by (1) a destination, (2) service provider 815 on behalf of the destination, or (3) some combination thereof.

For example, in an embodiment, service provider 815 may provide one or more subscription-based services that may be available to various customers. The services may be accessed by a customer via network 825. The customer may access the services using a computer system, such as user device 105. The services may include services that implement one or more embodiments of the invention or portions thereof. Service provider 815 may limit access to certain services based on, e.g., a customer service agreement between the customer and service provider 815.

The service agreement may allow the customer to access the services that may allow the customer to build, execute, and/or analyze a model, as described above. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources and/or network bandwidth used.

Cluster 1230 may include a number of units of execution (UEs) 830 that may perform processing of one or more embodiments of the invention or portions thereof on behalf of user device 105 and/or another entity, such as service provider 815. UEs 830 may reside on a single device or chip or on multiple devices or chips. For example, UEs 830 may be implemented in a single ASIC or in multiple ASICs. Likewise, UEs 830 may be implemented in a single computer system or in multiple computer systems. Other examples of UEs 830 may include FPGAs, complex programmable logic devices (CPLDs), application-specific instruction-set processors (ASIPs), processors, multiprocessor systems-on-chips (MPSoCs), graphic processing units, microprocessors, etc. UEs 830 may be configured to perform operations on behalf of another entity. For example, in an embodiment, UEs 830 may be configured to execute portions of code associated with TCE 110. Here, TCE 110 may dispatch certain activities pertaining to one or more embodiments of the invention to the UEs 830 for execution. Service provider 815 may configure cluster 820 to provide, for example, the above-described services to user device 105 on a subscription basis (e.g., via a web service).

The term "may" is used throughout this description and is intended to be interpreted, for example, as "having the potential to," "configured to," or "being able to", and not in a mandatory sense (e.g., as "must"). The terms "a", "an", and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Implementations of the invention may be implemented in many different forms of software, firmware, and hardware. The actual software code or hardware used to implement aspects does not limit the invention. Thus, the operation and behavior of the implementations described herein were described without reference to specific software code—it being understood that software and hardware can be designed to implement the implementations based on the description herein.

The term "logic" or "component" may be implemented by hardware (e.g., processor 220) or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the terms "comprises" or "comprising" when used in the specification is taken to specify the presence of stated features, integers, steps, or components, but does not preclude the presence or addition of one or more other features, integers, steps, components, or groups thereof.

No element, act, or instruction used in the present application should be construed as critical or essential to the implementations described herein unless explicitly described as such.

What is claimed is:

1. One or more computer-readable storage media for storing computer-executable instructions executable by processing logic, the computer-readable media storing one or more instructions for:
    identifying a non-blocking block in a graphical block diagram that includes the non-blocking block and other blocks, the other blocks including one or more non-blocking blocks, one or more blocking blocks, or a combination of one or more non-blocking blocks and one or more blocking blocks; and
    in response to the identifying of the non-blocking block:
        determining whether one or more of the other blocks are dependent on an output from the non-blocking block,
        partitioning execution of the non-blocking block into two or more execution stages, and
        generating an order of execution of the graphical blocks, the order including a first stage of execution of the two or more execution stages for the non-blocking block, followed by an execution of one or more of the other blocks that have been determined to not be dependent on the output from the non-blocking block, followed by a second stage of execution of the two or more execution stages of the non-blocking block.

2. The computer-readable media of claim 1, further comprising one or more instructions for:
    executing the first stage of execution of the two or more execution stages of the non-blocking block;
    executing at least one of the one or more of the other blocks; and
    executing the second stage of execution of the two or more execution stages of the non-blocking block.

3. The computer-readable media of claim 1, where the order of execution includes an execution of one or more of the other blocks before the execution of the first stage of the two or more execution stages of the non-blocking block.

4. The computer-readable media of claim 1, where the graphical block diagram is one of a time-based block diagram or a data flow diagram.

5. The computer-readable media of claim 1, where the two or more execution stages of the non-blocking block correspond to one of block methods output, update, derivative, or fire.

6. The computer-readable media of claim 1, where execution stages of non-blocking blocks are executed in one of same processes or different processes.

7. The computer-readable media of claim 1, where the order of execution is further defined by additional criteria.

8. The computer-readable media of claim 7, where the additional criteria include a user specified order of execution for a subset of non-blocking blocks.

9. The computer readable media of claim 7, where the additional criteria include an estimated execution time associated with the non-blocking block, and where the estimated execution time is based on a relative speed of execution associated with the non-blocking block in comparison to one or more other non-blocking blocks.

10. The computer-readable media of claim 7, where the additional criteria include an execution time associated with the non-blocking block, and where the execution time is based on one of an exact value of execution time, an approximate value of execution time, or a typical value of execution time associated with the non-blocking block.

11. The computer-readable media of claim 7, where the additional criteria include a first execution time associated with the non blocking block and a second execution time associated with the one or more of the other blocks, and where the first execution time is based on one of an exact value of execution time, an approximate value of execution time, or a typical value of execution time associated with the non-blocking block, and the second execution time is based on one of an exact value of execution time, an approximate value of execution time, or a typical value of execution time associated with the one or more of the other blocks.

12. The computer-readable media of claim 7, where the additional criteria include an execution time, associated with at least one of the non-blocking block or one or more of the other blocks, and is based on a previous execution of the graphical model or a previous execution of a portion of the graphical model.

13. The computer-readable media of claim 2, further comprising one or more instructions for:
determining whether the execution of the non-blocking block has completed;
executing at least one or more of the other blocks that are dependent on the output of the non-blocking block, when the execution of the non-blocking block has completed; and
executing at least one or more of the other blocks that are not dependent on the output of the non-blocking block, when the execution of the non-blocking block has not completed.

14. The computer-readable media of claim 13, where the one or more instructions for determining whether the execution of the non-blocking block has completed, further comprises one or more instructions for:
polling the non-blocking block.

15. The computer-readable media of claim 1, further comprising one or more instructions for:
polling the non-blocking block for completion of execution of the two or more execution stages based on additional criteria.

16. The computer-readable media of claim 15, where the additional criteria include a type of the non-blocking block.

17. The computer-readable media of claim 15, where the additional criteria include a time to complete execution value that is associated with the non-blocking block.

18. The computer-readable media of claim 17, where the time to complete execution value is an exact time value, an approximate time value, or a typical time value.

19. The computer-readable media of claim 17, where the time to complete execution value is obtained based on a previous execution of the graphical blocks or a previous execution of a portion of the graphical blocks.

20. The computer-readable media of claim 1, where the non-blocking block comprises one of an input/output board block, a conversion block, or a communication block.

21. The computer-readable media of claim 1, where one or more of the graphical blocks are at least one of a time-based block or a data flow block.

22. A method comprising:
identifying, by a device, a non-blocking block in a graphical block diagram that includes the non-blocking block and other blocks, the other blocks including one or more non-blocking blocks, one or more blocking blocks, or a combination of one or more non-blocking blocks and one or more blocking blocks; and
in response to the identifying of the non-blocking block:
determining, by the device, whether one or more of the other blocks are dependent on an output from the non-blocking block,
partitioning, by the device, execution of the non-blocking block into two or more execution stages, and
generating, by the device, an order of execution of the graphical blocks, the order including a first stage of execution of the two or more execution stages for the non-blocking block, followed by an execution of one or more of the other blocks that have been determined to not be dependent on the output from the non-blocking block, followed by a second stage of execution of the two or more execution stages of the non-blocking block.

23. The method of claim 22, further comprising:
executing the first stage of execution of the two or more execution stages of the non-blocking block;
executing at least one of the one or more of the other blocks; and
executing the second stage of execution of the two or more execution stages of the non-blocking block.

24. The method of claim 22, where the order of execution is based on additional criteria, the additional criteria include a user specified order of execution for the non-blocking block and the other blocks, the other blocks including the one or more non-blocking blocks.

25. The method of claim 22, where the order of execution is based on an estimated execution time associated with the non-blocking block, and where the estimated execution time is based on a relative speed of execution associated with the non-blocking block in comparison to one or more other non-blocking blocks.

26. The method of claim 22, where the order of execution time is based on an execution time associated with the non-blocking block, and where the execution time is based on one of an exact value of execution time, an approximate value of execution time, or a typical value of execution time associated with the non-blocking block.

27. The method of claim 22, where the order of execution time is based on a first execution time associated with the non blocking block and a second execution time associated with the one or more of the other blocks, and where the first execution time is based on one of an exact value of execution time, an approximate value of execution time, or a typical value of execution time associated with the non-blocking block, and the second execution time is based on one of an exact value of execution time, an approximate value of execution time, or a typical value of execution time associated with the one or more of the other blocks.

28. The method of claim 22, further comprising:
  determining whether the execution of the non-blocking block has completed;
  executing at least one or more of the other blocks that are dependent on the output of the non-blocking block, when the execution of the non-blocking block has completed; and
  executing at least one or more of the other blocks that are not dependent on the output of the non-blocking block, when the execution of the non-blocking block has not completed.

29. The method of claim 28, where the determining comprises:
  polling the non-blocking block for completion of execution of the two or more execution stages.

30. The method of claim 28, where the determining comprises:
  polling the non-blocking block, where the non-blocking block is polled based on a time to complete execution value that is associated with the non-blocking block.

31. The method of claim 30, where the time to complete execution value corresponds to an exact time value, an approximate time value, or a typical time value.

32. A system comprising:
  a memory to store instructions, and
  a processor to execute the instructions to:
    identify a non-blocking block in a graphical block diagram that includes the non-blocking block and other blocks, the other blocks including one or more non-blocking blocks, one or more blocking blocks, or a combination of one or more non-blocking blocks and one or more blocking blocks; and
    in response to the identifying of the non-blocking block:
      determine whether one or more of the other blocks are dependent on an output from the non-blocking block,
      partition execution of the non-blocking block into two or more execution stages, and
      generate an order of execution of the graphical blocks, the order including a first stage of execution of the two or more execution stages for the non-blocking block, followed by an execution of one or more of the other blocks that have been determined to not be dependent on the output from the non-blocking block, followed by a second stage of execution of the two or more execution stages of the non-blocking block.

33. The system of claim 32, where the processor is further to execute instructions to:
  poll the non-blocking block for completion of execution of the two or more execution stages.

34. The system of claim 32, where the non-blocking block is based on at least one of a type of the non-blocking block or a time to complete execution value, where the time to complete execution value corresponds to an exact time value, an approximate time value, or a typical time value.

35. The system of claim 32, where the non-blocking block comprises one of an input/output board block, a conversion block, or a communication block.

36. An apparatus comprising:
  means for identifying a non-blocking block in a graphical block diagram that includes the non-blocking block and other blocks, the other blocks including one or more non-blocking blocks, one or more blocking blocks, or a combination of one or more non-blocking blocks and one or more blocking blocks; and
  in response to the identifying of the non-blocking block:
    means for determining whether one or more of the other blocks are dependent on an output from the non-blocking block,
    means for partitioning execution of the non-blocking block into two or more execution stages, and
    means for generating an order of execution of the graphical blocks, the order including a first stage of execution of the two or more execution stages for the non-blocking block, followed by an execution of one or more of the other blocks that have been determined to not be dependent on the output from the non-blocking block, followed by a second stage of execution of the two or more execution stages of the non-blocking block.

37. The apparatus of claim 36, where the order of execution is further defined by additional criteria.

38. The apparatus of claim 37, where the additional criteria include a user specified order of execution for a subset of non-blocking blocks.

39. The apparatus of claim 37, where the additional criteria include an estimated execution time associated with the non-blocking block, and where the estimated execution time is based on a relative speed of execution associated with the non-blocking block in comparison to one or more other non-blocking blocks.

40. The apparatus of claim 37, where the additional criteria include an execution time associated with the non-blocking block, and where the execution time is based on one of an exact value of execution time, an approximate value of execution time, or a typical value of execution time associated with the non-blocking block.

41. The apparatus of claim 37, where the additional criteria include an execution time, associated with at least one of the non-blocking block or one or more of the other blocks, and is based on a previous execution of the graphical model or a previous execution of a portion of the graphical model.

42. The apparatus of claim 36, further comprising:
  means for determining whether the execution of the non-blocking block has completed;
  means for executing at least one or more of the other blocks that are dependent on the output of the non-blocking block, when the execution of the non-blocking block has completed; and
  means for executing at least one or more of the other blocks that are not dependent on the output of the non-blocking block, when the execution of the non-blocking block has not completed.

43. The apparatus of claim 42, where the means for determining comprises:
  means for polling the non-blocking block, where the non-blocking is polled on a time to complete execution value that is associated with the non-blocking block, and where the time to complete execution value is an exact time value, an approximate time value, or a typical time value.

* * * * *